United States Patent
Debbah et al.

(10) Patent No.: US 8,687,719 B2
(45) Date of Patent: Apr. 1, 2014

(54) METHOD AND APPARATUS FOR OFDM SPECTRAL DIVERSITY USING GUARD BANDS

(75) Inventors: Merouane Debbah, Paris (FR); Romain Couillet, Antibes (FR)

(73) Assignee: Ericsson Modems SA, Plan-les-Ouates (CH)

( * ) Notice: Subject to any disclaimer, the term of this patent is extended or adjusted under 35 U.S.C. 154(b) by 0 days.

(21) Appl. No.: 13/001,934

(22) PCT Filed: Jul. 4, 2009

(86) PCT No.: PCT/EP2009/004836
§ 371 (c)(1),
(2), (4) Date: May 10, 2011

(87) PCT Pub. No.: WO2010/003597
PCT Pub. Date: Jan. 14, 2010

(65) Prior Publication Data
US 2011/0211652 A1    Sep. 1, 2011

(30) Foreign Application Priority Data

Jul. 5, 2008 (EP) ..................... 08012192
Dec. 31, 2008 (EP) ..................... 08368023

(51) Int. Cl.
*H04K 1/10* (2006.01)
*H04L 27/28* (2006.01)

(52) U.S. Cl.
USPC ........... 375/260; 375/259; 375/296; 375/135; 375/226

(58) Field of Classification Search
USPC .......................... 375/259, 260, 296
See application file for complete search history.

(56) References Cited

U.S. PATENT DOCUMENTS

| 6,876,672 | B1 * | 4/2005 | Castelain ............... 370/483 |
| 7,596,080 | B2 * | 9/2009 | Gerlach ............... 370/203 |
| 7,639,639 | B2 * | 12/2009 | Herdin ............... 370/315 |
| 2004/0038651 | A1 * | 2/2004 | Okuhata ............... 455/130 |
| 2006/0198292 | A1 * | 9/2006 | Yoshii et al. ............... 370/208 |
| 2006/0274679 | A1 | 12/2006 | Khandekar et al. | |

FOREIGN PATENT DOCUMENTS

| EP | 1265411 A1 | 12/2002 |
| EP | 1598971 A1 | 11/2005 |
| EP | 1863215 A2 | 12/2007 |
| JP | 2006-504324 A | 11/2002 |
| JP | 2008-72275 | 3/2008 |

OTHER PUBLICATIONS

IEEE Std 802.16e; Standard for Local and metropolitan area networks; "Part 16: Air Inerface for Fixed and Mobile Broadband Wireless Access Systems; Amendment 2: Physical Medium Access Control Layers for Combined Fixed Mobile Operation in Licensed Bands and Corrigendum 1"; IEEE Std. 802.16e and IEEE Std. 802.16-2004/Cor1-2005 (Amendment and Corrigendum to IEEE Std. 802.16-2004; Feb. 2006; pp. 1-75.

(Continued)

*Primary Examiner* — Qutbuddin Ghulamali
(74) *Attorney, Agent, or Firm* — Potomac Patent Group PLLC

(57) ABSTRACT

An OFDM modulation process and means for transmitting multiple carriers through a communication channel having a bandwidth arranged ion chunks with further subcarriers being allocated to form at least one guard band, comprising automatically and periodically shifting said chunks to the left or to the side in order to overlap said guard band and increase spectral diversity.

7 Claims, 6 Drawing Sheets

(56) References Cited

OTHER PUBLICATIONS

IEEE Std 802.16e; Standard for Local and metropolitan area networks; "Part 16: Air Inerface for Fixed and Mobile Broadband Wireless Access Systems; Amendment 2: Physical Medium Access Control Layers for Combined Fixed Mobile Operation in Licensed Bands and Corrigendum 1"; IEEE Std. 802.16e and IEEE Std. 802.16-2004/Cor1-2005 (Amendment and Corrigendum to IEEE Std. 802.16-2004; Feb. 2006; pp. 76-125.

IEEE Std 802.16e; Standard for Local and metropolitan area networks; "Part 16: Air Inerface for Fixed and Mobile Broadband Wireless Access Systems; Amendment 2: Physical Medium Access Control Layers for Combined Fixed Mobile Operation in Licensed Bands and Corrigendum 1"; IEEE Std. 802.16e and IEEE Std. 802.16-2004/Cor1-2005 (Amendment and Corrigendum to IEEE Std. 802.16-2004; Feb. 2006; pp. 126-200.

IEEE Std 802.16e; Standard for Local and metropolitan area networks; "Part 16: Air Inerface for Fixed and Mobile Broadband Wireless Access Systems; Amendment 2: Physical Medium Access Control Layers for Combined Fixed Mobile Operation in Licensed Bands and Corrigendum 1"; IEEE Std. 802.16e and IEEE Std. 802.16-2004/Cor1-2005 (Amendment and Corrigendum to IEEE Std. 802.16-2004; Feb. 2006; pp. 201-250.

IEEE Std 802.16e; Standard for Local and metropolitan area networks; "Part 16: Air Inerface for Fixed and Mobile Broadband Wireless Access Systems; Amendment 2: Physical Medium Access Control Layers for Combined Fixed Mobile Operation in Licensed Bands and Corrigendum 1"; IEEE Std. 802.16e and IEEE Std. 802.16-2004/Cor1-2005 (Amendment and Corrigendum to IEEE Std. 802.16-2004; Feb. 2006; pp. 251-300.

IEEE Std 802.16e; Standard for Local and metropolitan area networks; "Part 16: Air Inerface for Fixed and Mobile Broadband Wireless Access Systems; Amendment 2: Physical Medium Access Control Layers for Combined Fixed Mobile Operation in Licensed Bands and Corrigendum 1"; IEEE Std. 802.16e and IEEE Std. 802.16-2004/Cor1-2005 (Amendment and Corrigendum to IEEE Std. 802.16-2004; Feb. 2006; pp. 301-350.

IEEE Std 802.16e; Standard for Local and metropolitan area networks; "Part 16: Air Inerface for Fixed and Mobile Broadband Wireless Access Systems; Amendment 2: Physical Medium Access Control Layers for Combined Fixed Mobile Operation in Licensed Bands and Corrigendum 1"; IEEE Std. 802.16e and IEEE Std. 802.16-2004/Cor1-2005 (Amendment and Corrigendum to IEEE Std. 802.16-2004; Feb. 2006; pp. 351-400.

IEEE Std 802.16e; Standard for Local and metropolitan area networks; "Part 16: Air Inerface for Fixed and Mobile Broadband Wireless Access Systems; Amendment 2: Physical Medium Access Control Layers for Combined Fixed Mobile Operation in Licensed Bands and Corrigendum 1"; IEEE Std. 802.16e and IEEE Std. 802.16-2004/Cor1-2005 (Amendment and Corrigendum to IEEE Std. 802.16-2004; Feb. 2006; pp. 401-475.

IEEE Std 802.16e; Standard for Local and metropolitan area networks; "Part 16: Air Inerface for Fixed and Mobile Broadband Wireless Access Systems; Amendment 2: Physical Medium Access Control Layers for Combined Fixed Mobile Operation in Licensed Bands and Corrigendum 1"; IEEE Std. 802.16e and IEEE Std. 802.16-2004/Cor1-2005 (Amendment and Corrigendum to IEEE Std. 802.16-2004; Feb. 2006; pp. 476-550.

IEEE Std 802.16e; Standard for Local and metropolitan area networks; "Part 16: Air Inerface for Fixed and Mobile Broadband Wireless Access Systems; Amendment 2: Physical Medium Access Control Layers for Combined Fixed Mobile Operation in Licensed Bands and Corrigendum 1"; IEEE Std. 802.16e and IEEE Std. 802.16-2004/Cor1-2005 (Amendment and Corrigendum to IEEE Std. 802.16-2004; Feb. 2006; pp. 551-625.

IEEE Std 802.16e; Standard for Local and metropolitan area networks; "Part 16: Air Inerface for Fixed and Mobile Broadband Wireless Access Systems; Amendment 2: Physical Medium Access Control Layers for Combined Fixed Mobile Operation in Licensed Bands and Corrigendum 1"; IEEE Std. 802.16e and IEEE Std. 802.16-2004/Cor1-2005 (Amendment and Corrigendum to IEEE Std. 802.16-2004; Feb. 2006; pp. 626-700.

IEEE Std 802.16e; Standard for Local and metropolitan area networks; "Part 16: Air Inerface for Fixed and Mobile Broadband Wireless Access Systems; Amendment 2: Physical Medium Access Control Layers for Combined Fixed Mobile Operation in Licensed Bands and Corrigendum 1"; IEEE Std. 802.16e and IEEE Std. 802.16-2004/Cor1-2005 (Amendment and Corrigendum to IEEE Std. 802.16-2004; Feb. 2006; pp. 701-775.

IEEE Std 802.16e; Standard for Local and metropolitan area networks; "Part 16: Air Inerface for Fixed and Mobile Broadband Wireless Access Systems; Amendment 2: Physical Medium Access Control Layers for Combined Fixed Mobile Operation in Licensed Bands and Corrigendum 1"; IEEE Std. 802.16e and IEEE Std. 802.16-2004/Cor1-2005 (Amendment and Corrigendum to IEEE Std. 802.16-2004; Feb. 2006; pp. 776-822.

International Search Report for corresponding International Application No. PCT/EP2009/004836 mailed Oct. 22, 2009.

Written Opinion for corresponding International Application No. PCT/EP2009/004836 mailed Oct. 22, 2009.

Sriram Vishwanath et al., "Duality, Achievable Rates, and Sum-Rate Capacity of Gaussian MIMO Broadcast Channels," IEEE Transactions on Information Theory, vol. 49, No. 10; Oct. 2003; pp. 2658-2668.

Alan Clark et al., "Instantaneous Capacity of OFDM on Rayleigh-Fading Channels", IEEE Transactions on Information Theory, vol. 53, No. 1, Jan. 2007; pp. 355-361.

Armin Dammann et al., "Performance of Low Complex Antenna Diversity Techniques for Mobile OFDM Systems", Proceedings 3rd International Workshop on Multi-Carrier Spread-Spectrum & Related Topics (MC-SS 2001), Oberpfaffenhofen, Germany; Sep. 2001; pp. 53-64.

C.E. Shannon, "A Mathematical Theory of Communication", The Bell System Technical Journal, vol. 27; Jul., Oct. 1948; pp. 379-423 and 623-656.

Pramad Viswanath et al., "Opportunistic Beamforming Using Dumb Antennas", IEEE Transactions on Information Theory, vol. 48, No. 6; Jun. 2002; pp. 1277-1294.

Ralf R. Müller et al., "Compact MIMO Receive Antennas", 43rd Annual Allerton Conference on Communications, Control and Computing, Monticello, IL, USA; Sep. 2005; pp. 1-10.

John A.C. Bingham, "Multicarrier Modulation for Data Transmission: An Idea Whose Time Has come," IEEE Communications Magazine, vol. 28; May 1990; pp. 5-14.

Mérouane Debbah, "Mobile Communication Techniques—Third Part: Application to Wireless", course, Eurecom. Institut., Oct. 26, 2009; pp. 1-58.

Matthew R. McKay et al., "On the Mutual Information Distribution of OFDM-Based Spatial Multiplexing: Exact Variance and Outage Approximation", IEEE Transactions on Information Theory, vol. 54, No. 7; Jul. 208; pp. 3260-3278.

Ericsson, Nokia, Motorola, Rhode & Schwarz, "Proposal for LTE Channel Models", TSG-RAN WG4 meeting #43, R4-070572, Kobe, Japan, May 7-11, 2007; pp. 1-11.

Lizhong Zheng et al., "Diversity and Multiplexing: A Fundamental Tradeoff in Multiple Antenna Channels," IEEE Transactions on Information Theory, vol. 49, No. 5; May 2003; pp. 1073-1096.

Joseph Mitola, III, et al., "Cognitive Radio: Making Software Radios More Personal", IEEE Personal Communications, vol. 6, No. 4; Aug. 1999; pp. 13-18.

David D. Yu et al., "Iterative Water-Filling for Optimal Resource Allocation in OFDM Multiple-Access and Broadcast Channels", Global Telecommunications Conference, GLOBECOM 2006, IEEE; pp. 1-5.

Andrea J. Goldsmith et al., "Capacity Limits of MIMO Channels", IEEE Journal on Selected Areas in Communications, vol. 21, No. 5; Jun. 2003; pp. 684-702.

Hyundong Shin et al., "Capacity of Multiple-Antenna Fading Channels: Spatial Fading Correlation, Double Scattering, and Keyhole", IEEE Transactions on Information Theory, vol. 49, No. 10, Oct 2003; pp. 2636-2647.

(56) References Cited

OTHER PUBLICATIONS

Ezio Biglieri et al., "Fading Channels: Information-Theoretic and Communications Aspects," IEEE Transactions on Information Theory, vol. 44, No. 6; Oct. 1998; pp. 2619-2692.

ANSI/IEEE Std 802.11, 1999 Edition; "Part 11: Wireless Medium Access Control (MAC) and Physical Layer (PHY) specifications"; IEEE Standards for Information Technology—Telecommunications and Information Exchange Between Systems; Local and Metropolitan Area Networks;Specific Requirements; (R2003); Aug. 20, 1999; pp. 1-50. Previously Submitted Sep. 23, 2011.

ANSI/IEEE Std 802.11, 1999 Edition; "Part 11: Wireless Medium Access Control (MAC) and Physical Layer (PHY) specifications"; IEEE Standards for Information Technology—Telecommunications and Information Exchange Between Systems; Local and Metropolitan Area Networks;Specific Requirements; (R2003); Aug. 20, 1999; pp. 50-100. Previously Submitted Sep. 23, 2011.

ANSI/IEEE Std 802.11, 1999 Edition; "Part 11: Wireless Medium Access Control (MAC) and Physical Layer (PHY) specifications"; IEEE Standards for Information Technology—Telecommunications and Information Exchange Between Systems; Local and Metropolitan Area Networks;Specific Requirements; (R2003); Aug. 20, 1999; pp. 101-150. Previously Submitted Sep. 23, 2011.

ANSI/IEEE Std 802.11, 1999 Edition; "Part 11: Wireless Medium Access Control (MAC) and Physical Layer (PHY) specifications"; IEEE Standards for Information Technology—Telecommunications and Information Exchange Between Systems; Local and Metropolitan Area Networks;Specific Requirements; (R2003); Aug. 20, 1999; pp. 151-200. Previously Submitted Sep. 23, 2011.

ANSI/IEEE Std 802.11, 1999 Edition; "Part 11: Wireless Medium Access Control (MAC) and Physical Layer (PHY) specifications"; IEEE Standards for Information Technology—Telecommunications and Information Exchange Between Systems; Local and Metropolitan Area Networks;Specific Requirements; (R2003); Aug. 20, 1999; pp. 201-250. Previously Submitted Sep. 23, 2011.

ANSI/IEEE Std 802.11, 1999 Edition; "Part 11: Wireless Medium Access Control (MAC) and Physical Layer (PHY) specifications"; IEEE Standards for Information Technology—Telecommunications and Information Exchange Between Systems; Local and Metropolitan Area Networks;Specific Requirements; (R2003); Aug. 20, 1999; pp. 251-300. Previously Submitted Sep. 23, 2011.

ANSI/IEEE Std 802.11, 1999 Edition; "Part 11: Wireless Medium Access Control (MAC) and Physical Layer (PHY) specifications"; IEEE Standards for Information Technology—Telecommunications and Information Exchange Between Systems; Local and Metropolitan Area Networks;Specific Requirements; (R2003); Aug. 20, 1999; pp. 301-390. Previously Submitted Sep. 23, 2011.

ANSI/IEEE Std 802.11, 1999 Edition; "Part 11: Wireless Medium Access Control (MAC) and Physical Layer (PHY) specifications"; IEEE Standards for Information Technology—Telecommunications and Information Exchange Between Systems; Local and Metropolitan Area Networks;Specific Requirements; (R2003); Aug. 20, 1999; pp. 391-450. Previously Submitted Sep. 23, 2011.

ANSI/IEEE Std 802.11, 1999 Edition; "Part 11: Wireless Medium Access Control (MAC) and Physical Layer (PHY) specifications"; IEEE Standards for Information Technology—Telecommunications and Information Exchange Between Systems; Local and Metropolitan Area Networks;Specific Requirements; (R2003); Aug. 20, 1999; pp. 451-528. Previously Submitted Sep. 23, 2011.

Gray, R. M., Toeplitz and Circulant Matrices: A Review (Foundations and Trends in Communications and Information Theory), vol. 2, Issue 3, pp. 155-239, Now Publishers Inc., Jan. 2, 2006 Previously Submitted Sep. 22, 2011.

Japanese Office Action in corresponding Japanese Application No. 2011-515245 mailed Sep. 10, 2013.

* cited by examiner

α-OFDM Transmission Scheme

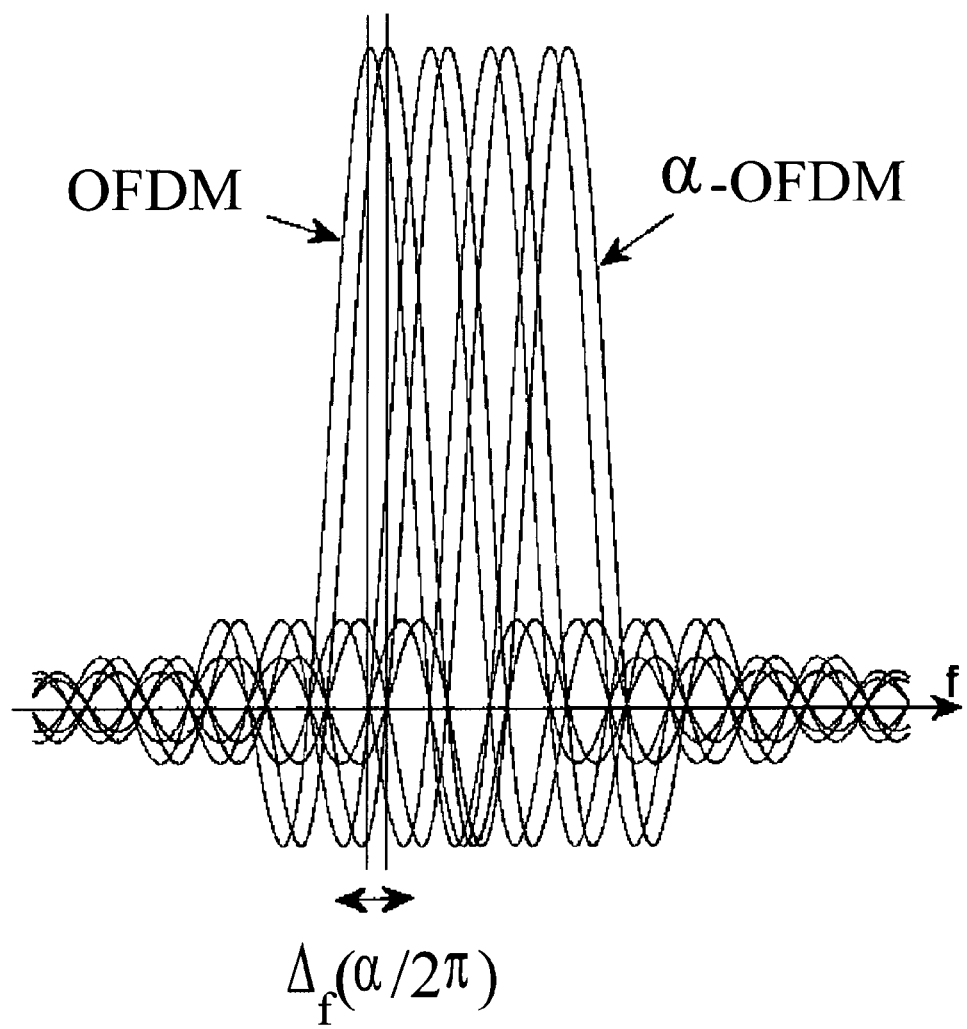
Fig. 2  α-OFDM

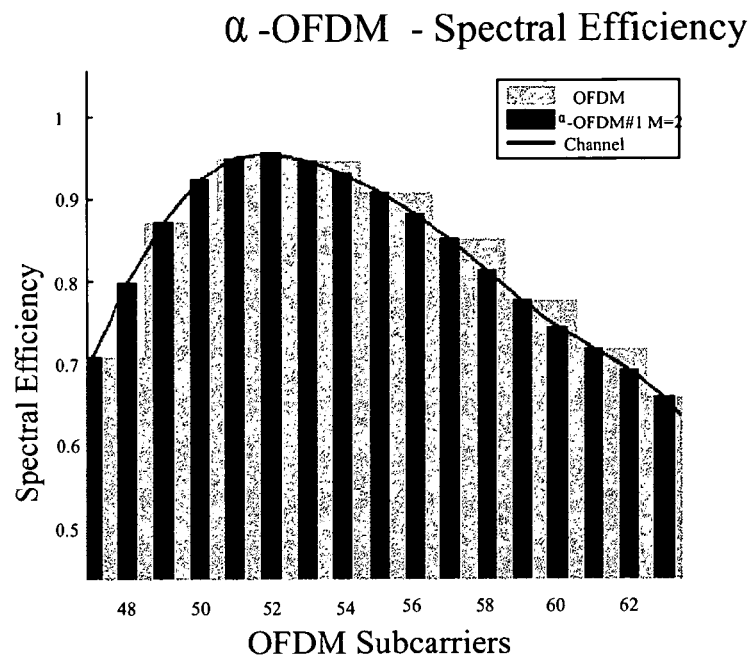
Fig. 3   Spectral Efficiency of α-OFDM
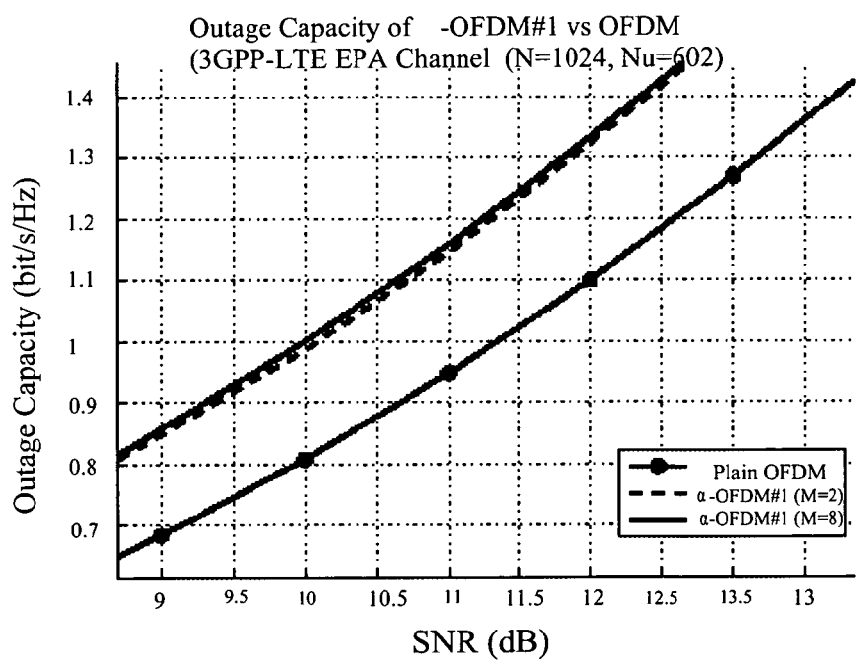
Fig. 4   α-OFDM#1 Outage Capacity in 3GPP-LTE EPA

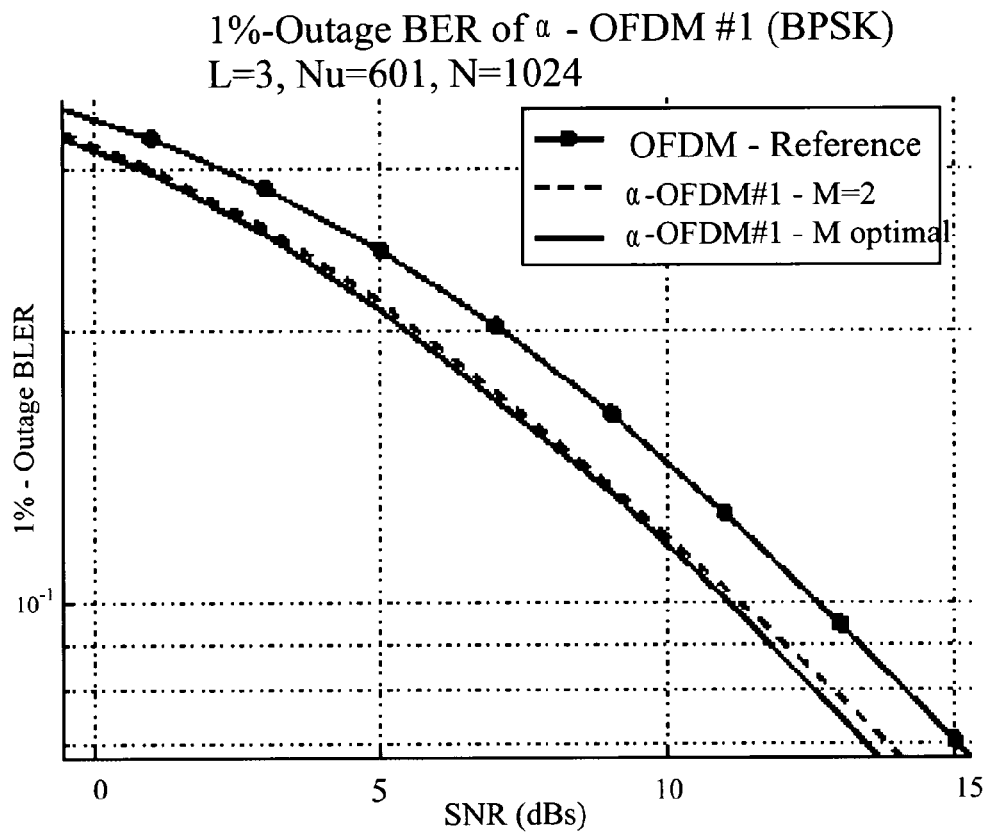
Fig. 5 α-OFDM#1 BER
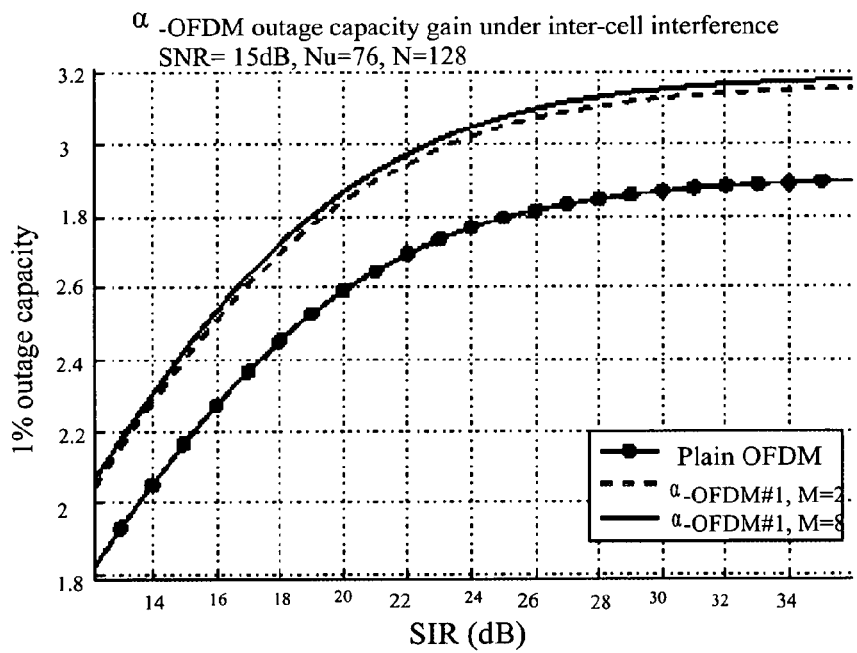
Fig. 6 α-OFDM#1 with Inter-Cell Interference

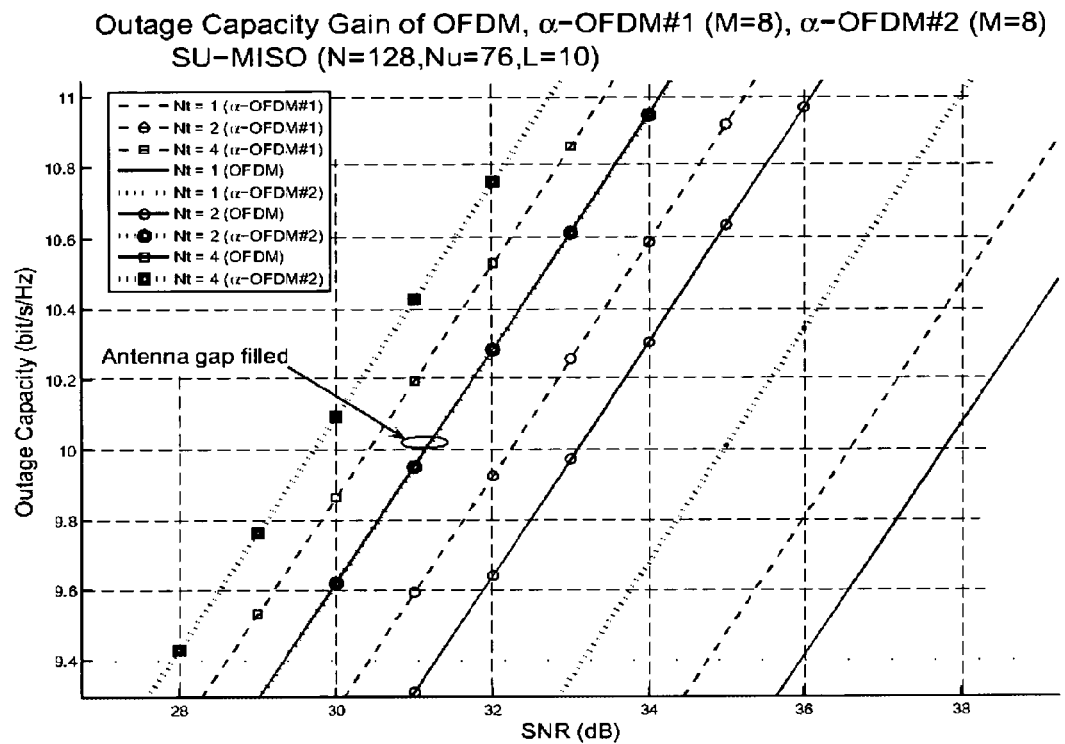
Fig. 7 Outage capacity gain for α-OFDM MISO
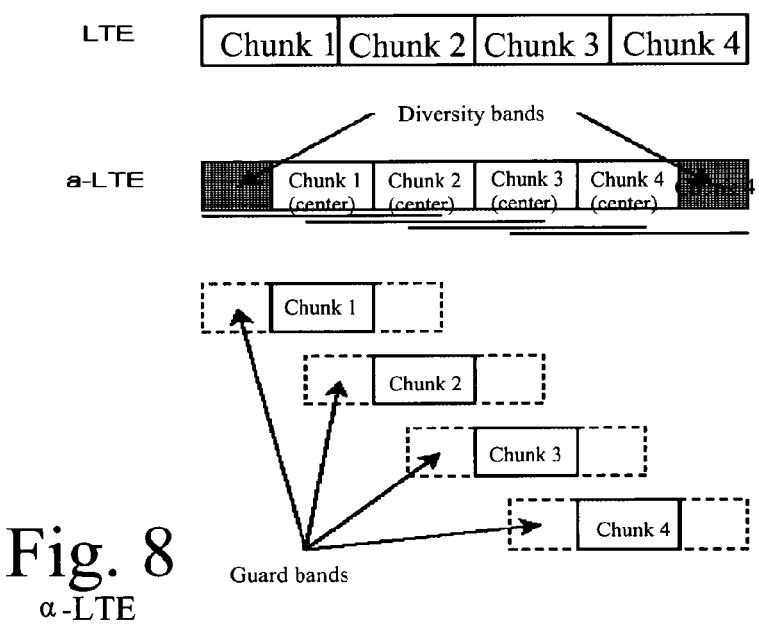
Fig. 8 α-LTE

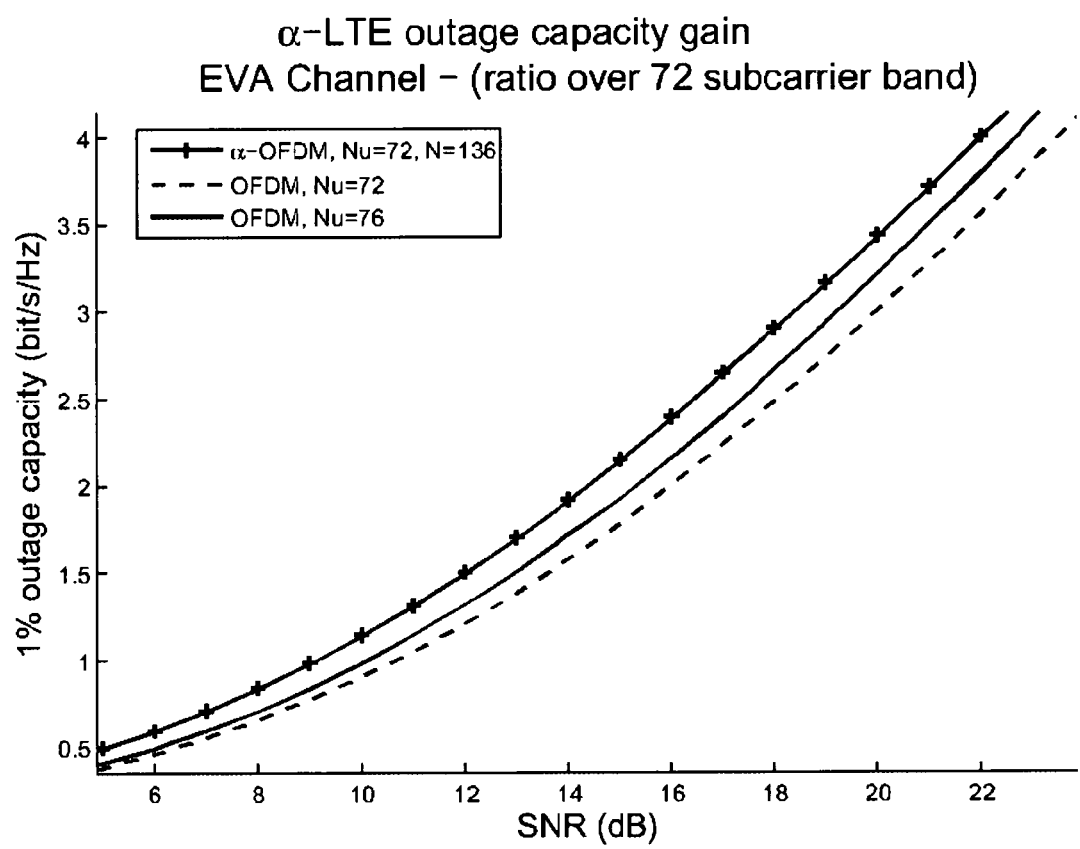
Fig. 9  LTE & α-LTE capacity

METHOD AND APPARATUS FOR OFDM SPECTRAL DIVERSITY USING GUARD BANDS

TECHNICAL FIELD

The invention relates to telecommunication and more particularly to a method for performing Orthogonal Frequency Division Multiplexing (OFDM) modulation and increasing spectral diversity in short-time transmissions and an apparatus for performing flexible OFDM modulation.

BACKGROUND ART

The trend of mobile communications is to generalize the transmission of short size packets and designers of mobile communication systems are constantly concerned with the problem of maintaining high transfer rate despite the locally fixed and potentially severely faded profile of the transmission channel Techniques are already known for maintaining a high transfer rate and for preventing the loss of packets in short-time transmissions, by increasing diversity.

Designers may take advantage of the known Cyclic Delay Diversity (CDD) technique based on the addition of new antennas for improving the communication through the channel being considered.

Alternatively, there is given the possibility to use hoping frequency techniques which is based on OSI layer-3 control procedures and signaling techniques allowing both mobile and the base station to switch the communication to a different set of subcarriers.

Because such hoping techniques involves the use of signaling process between the mobile and the base station, such techniques can clearly only be considered for long attenuations of the channel extending over several milliseconds.

It should be noticed that the problem of short attenuation of the channel is particularly critical in an urban environment, when the mobile is closer to the base station.

Those techniques are not usable for shorter attenuation of the channels, which might cause the loss of the whole packet.

There is therefore a need for an alternative technique, close to the physical layer with respect to the OSI architecture, which takes into account the short attenuation of the channel and thus the instantaneous data rate of a digital communication.

SUMMARY OF THE INVENTION

It is an object of the present invention to provide a new method of OFDM modulation which improves the instantaneous data rate of a digital communication even in the case of a short attenuation of the channel.

It is a further object of the present invention to provide an improved method for OFDM modulation which increases the spectral diversity.

It is still another object of the present invention to provide an apparatus for performing a flexible OFDM modulation.

These and other objects of the invention are achieved by means of an OFDM modulation process for transmitting multiple carriers through a communication channel having a bandwidth W split in a total of N subcarriers arranged in K chunks of M subcarriers each, with N−K×M subcarriers being allocated to form at least one guard band, the process comprising the step of automatically and periodically shifting the said chunks to the left (i.e. in lower frequency band) or to the right (i.e. In higher frequency band) sides in order to overlap the said guard band and increase the spectral diversity.

In one embodiment N−K×M=2×Ms subcarriers are arranged in order to form a first and a second guard band, respectively located at the left and at the right sides of the said bandwidth.

For each symbol being transmitted, are provided:
a first shift towards left of the sub carriers allocated to each chunk;
a second shift towards right of the sub carriers allocated to the chunks,
so as to increase diversity.

In one embodiment, there is provided a transmission method which comprises the steps of:
receiving a sequence of OFDM symbol N-length vector or block $s=(s_1 \ldots s_N)^T$ in the frequency domain;
applying an inverse Discrete Fourier Transform or DFT in order to generate a vector $x=(x_1 \ldots x_N)^T$ based on the following formula:

$$x = F_{N,\alpha}^H s$$
$$= \left[F_N \text{diag}\left(1, e^{i\alpha \frac{1}{N}}, \ldots, e^{i\alpha \frac{N-1}{N}}\right)\right]^H s$$

where $F_N$ corresponds to the N-size Discrete Fast Transform (DFT) matrix with $$F_{m,n} = e^{-2\pi i \frac{nm}{N}}$$

copying and multiplying the $N_L$ first symbols of x by $e^{i\alpha}$ in order to constitute a cyclic-prefix preventing inter-symbol interference;
concatenating the said cyclic-prefix with the said vector x in order to form an extended vector:

$$x_{ext} = [e^{i\alpha} x_{N-NL+1}, e^{i\alpha} x_{N-NL+2}, \ldots, e^{i\alpha} x_N, x_1, \ldots, x_N]^T$$

In one embodiment, three distinctive values $\alpha_1, \alpha_2, \alpha_3$ are successively applied for three consecutive OFDM symbol vectors. For example, the triplet $(-\alpha, 0, \alpha)$ can be used to automatically cause a shifting to the right, to null and to the left of the bandwidth. It should be noticed that $\alpha=0$, corresponds to the normal IDFT conversion process.

There is also provided a receiving method comprising the steps of:
receiving $N_L$ symbols and suppressing the said cyclic prefix in order to generate a vector y;
generating a length-N vector z in accordance with the formula:

$$z = F_{N,\alpha} y$$
$$= F_N \text{diag}\left(1, e^{i\alpha \frac{1}{N}}, \ldots, e^{i\alpha \frac{N-1}{N}}\right) y$$

where $F_N$ corresponds to the N-size Discrete Fast Transform (DFT) matrix with $$F_{m,n} = e^{-2\pi i \frac{nm}{N}}$$

In one embodiment, a particular shifting pattern is defined as:

$$\mathcal{M} = \left\{0, e^{2\pi i \frac{1}{M}}, \ldots, e^{2\pi i \frac{M-1}{M}}\right\}$$

where M is the number of allowed shifts (e.g. in the previous embodiments, M=3). At last, the invention provides a OFDM modulation system adapted for carrying out the method defined above.

DESCRIPTION OF THE DRAWINGS

Other features of one or more embodiments of the invention will best be understood by reference to the following detailed description when read in conjunction with the accompanying drawings:

FIG. 2 illustrates the spectrum representative of the α-OFDM

FIG. 3 illustrates a flow chart detailing the OFDM subcarriers in one embodiment.

FIG. 4 illustrates the α-OFDM #1 outage capacity in 3GPP-LTE EPA

FIG. 5 illustrates the α-OFDM #1 Bit Error Rate

FIG. 6 illustrates the α-OFDM #1 with Inter-cell interference

FIG. 7 illustrates the Outage Capacity gain for α-OFDM MISO

FIG. 8 illustrates the general principle of α-LTE

FIG. 9 shows a comparison of the LTE and α-LTE outage capacity.

DESCRIPTION OF THE PREFERRED EMBODIMENTS OF THE INVENTION

Figure 1:
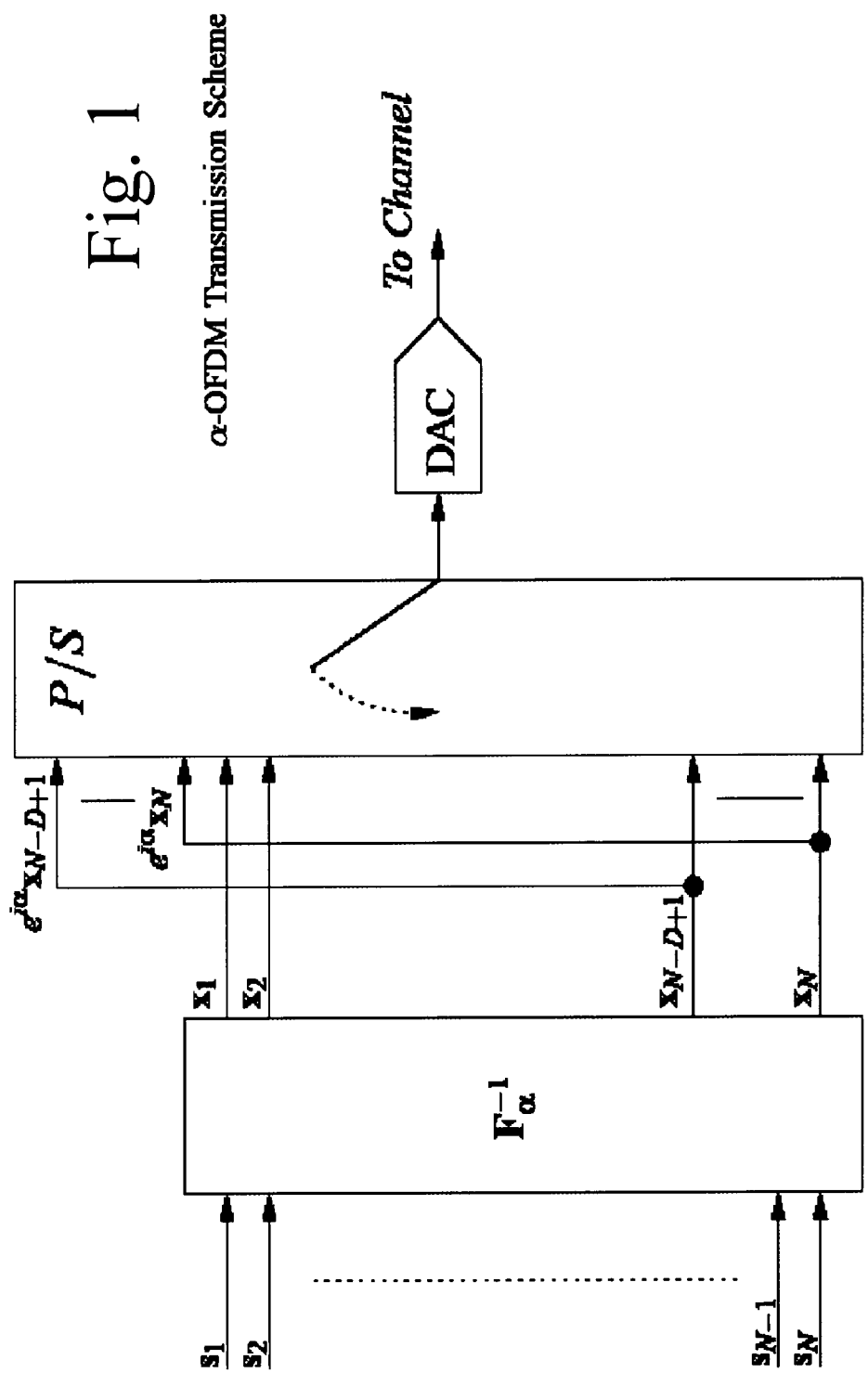
FIG. 1 illustrates the basic principle of the α-OFDM transmission scheme in accordance with one embodiment.

Abstract—This paper introduces α-OFDM, a generalization of the Orthogonal Frequency Division Multiplexing modulation scheme. α-OFDM is named after the time-domain rotation of angle α introduced in addition to post-IFFT (at transmitter side) and pre-FFT (at the receiver side) operations that allow for more subcarrier flexibility. The potential outage capacity gain and outage Bit Error Rate (BER) of α-OFDM over classical OFDM are discussed and examples of application are provided. A practical example presented here is an enhanced 3GPP Long Term Evolution (LTE) scheme, called α-LTE, that performs better than standardized 3GPP-LTE in terms of outage BER and outage capacity under low-to-medium SNR and short channel conditions and asymptotically overtakes the latter in all channel conditions.

Remarkably, up to 2 dB gain can be obtained in outage BER as well as outage capacity using α-OFDM. This typical gain is found to be increased when considering outage performance in inter-cell interference scenarios. Some examples of the α-LTE scheme show the same performance gain for moderate SNR.

I. Introduction

With the ever-growing multiplication of wireless communication devices, the incentive for higher bit rates has reached a common understanding that Orthogonal Frequency Division Multiplexing (OFDM) is to be considered the modulation scheme of most of the future wireless communication technologies. IEEE 802.11 [1], WiMax/802.16 [2], 3GPP Long Term Evolution (LTE) [3] as well as many UltraWide Band (UWB) technologies have already rallied in favour of OFDM. The attractive aspects of OFDM are numerous; especially, a key advantage of OFDM over other classical modulation schemes is that, as detailed in part V, OFDM can be made such that its spectrum efficiency is close to a hundred percent. Nonetheless the advantage that is usually acknowledged is the seemingly flat fading aspect of the channel that prevents high computational decoding at the receiver side. The latter is the outcome of the OFDM channel model that can be represented as a circulant matrix in the time-domain [7] thanks to the cyclic prefix. Circulant matrices are diagonalizable in the Fourier basis, thus engendering the flat fading aspect of the OFDM modulation. The study of these circulant matrices is the focus of this paper. Those matrices particularly simplify the transmission and decoding schemes and provide easy formulations of the classical performance criteria. Two usual performance criteria are found as the channel capacity [4], which corresponds to the maximum quantity of bits that can be reliably (ie, with an arbitrarily low decoding error rate at the reception) transmitted on the channel, and the Bit Error Rate (BER) that is, for a given decoding scheme, the amount of erroneously decoded bits at the reception.

For continuous mode schemes, for which communication duration is large compared to the channel coherence time, the system performance is usually measured in terms of the ergodic capacity performance in the Shannon sense [4], i.e. the mean capacity averaged over all possible channel realizations. However in modern communications, packet-switch mode for which data is sent by bursts has overcome the traditional circuit-switch mode that connects the system transmitter to the system receiver through a dedicated link that is used during the whole communication time. The former communication method cannot be evaluated through ergodic capacity since the communication time is typically small compared to the channel coherence time. Capacity versus 1% outage, that corresponds to the transmission rate achievable 99% of the time, is usually considered a satisfactory performance measure for such systems.

Regarding this performance measure, OFDM presents a strong drawback, linked to the very memoryless seemingly flat fading aspect, commonly pointed out as the strength of OFDM. In deep fading situations, part of the OFDM symbol might be impossible to decode, spawning strong instantaneous potential errors in the transmission. This results in a consequent drop in outage capacity. To overcome this issue, [5] proposed a dynamic beamforming scheme using multiple antennas, known as "dumb antennas", which modulate the transmitted signals by a time-varying phase (having then for effect to doctor the transmission channel), then generating different power beams in space. This scheme, which requires the addition of extra antennaes, was adapted for OFDM as the commonly used Cyclic Delay Diversity (CDD-OFDM) scheme in which time domain data are sent through an array of antennaes that apply each a different rotation angle in order to improve frequency selectivity in the channel [21]. [6] recently suggested a compact MIMO system which emulates many antennaes from one single virtually rotating compact antenna. In spite of its many practical issues, compact MIMO systems tend to allow simultaneous signal decoding from many channel paths. In multi-user systems, Multiple Access schemes based on OFDM (OFDMA) commonly use system-wide schedulers that associate frequency subbands to each user for a certain amount of time, before rescheduling. This requires a heavy link layer management, that slices the time into frame chunks. Those chunks correspond to the atomic time division for which each user is restrained to a fixed subchannel. In the following study, we introduce a scheme called α-OFDM which generalizes OFDM. α-OFDM provides more flexibility to the OFDM subcarriers set but, as will be reported in section V, this scheme does not provide any strong performance increase as is. Our main interest in α-OFDM is to dynamically use the frequency bands adjacent to those allocated to the regular OFDM system to benefit from channel diversity with no higher level scheduling mechanism. When extended to systems that we introduce later in this contribution, α-OFDM might provide important interesting gains in terms of 1% outage capacity or 1% outage BER, that we define as the maximum Bit Error Rate that lies 1% of the time. In the first section, we shall study the mathematical extension of α-circulant matrices and show that, similarly to circulant matrices, those can be diagonalized in a Fourier-like basis. Then we shall discuss the actual effect of α-OFDM over classical OFDM to show that, apart from an increased subcarrier flexibility, α-OFDM only slightly improves the OFDM performance. Then practical system schemes using α-OFDM are presented and special attention is made on channel diversity that is easier to provide with α-OFDM than with classical OFDM schedulers. Finally we introduce some practical applications that provide interesting increase in performance, thanks to very minimal changes to the OFDM system standards. In particular we derive an extention for LTE, that we named α-LTE which proposes an unscheduled way to achieve better performance than the current 3GPPLTE under short channel constraints and low-to-medium SNR value. A generalization of this novel scheme shows even more general asymptotical performance (i.e. when the service provider cuts the available bandwidth in numerous chunks) under any channel length or SNR range.

II. Circulant and α-Circulant Matrices

In the following boldface uppercase (resp. lowercase) symbols will be used for time-domain matrices (resp. vectors). Italic uppercase will be used for their corresponding frequency-domain representation. In particular $H \xrightarrow{\mathcal{F}} H$ means that $H$ is the Discrete Fourier Transform of $H$. $X^{-1}$ will correspond to the inverse of matrix $X$ when it exists. The notation $(.)^T$ will be used for matrix transpose and $\mathrm{diag}(x)$ is the diagonal matrix generated from the entries of vector $x$. The binary relation symbol $X|Y$ will stand for the divisibility of integer $Y$ by integer $X$. $P$, $N$ and $\Delta$ respectively represent the real ensemble, the positive integer ensemble and the decimal ensemble.

Definition 1: A circulant matrix $H$ with $L$ multipaths is a $N \times N$ ($L \leq N$) Toeplitz matrix of the form $$H = \begin{bmatrix} h_0 & 0 & \cdots & 0 & h_{L-1} & \cdots & h_1 \\ h_1 & h_0 & \ddots & & & \ddots & \vdots \\ \vdots & & \ddots & \ddots & & & \\ h_{L-1} & & & \ddots & \ddots & & 0 \\ 0 & \ddots & & & \ddots & \ddots & \vdots \\ \vdots & \ddots & \ddots & & & h_0 & 0 \\ 0 & \cdots & 0 & h_{L-1} & \cdots & h_1 & h_0 \end{bmatrix}. \quad (1)$$

This is a matrix with first column $[h_0, \ldots, h_{L-1}, 0, \ldots, 0]^T$, and subsequent columns are successive cyclic shifts of this column. It has been shown that all circulant matrices can be diagonalized in the Fourier basis $F_N$, and their eigenvalues are the discrete Fourier transforms (DFT) of their first column [10].

Definition 2: For $z = \rho e^{i\alpha} \in \mathbb{C}((\rho, \alpha) \in P^+ \times P)$ we call a $N \times N$ matrix $H$ ($\rho, \alpha$)-circulant with $L$ multipaths if it is of the form $$H = \begin{bmatrix} h_0 & 0 & \cdots & 0 & \rho e^{i\alpha} h_{L-1} & \cdots & \rho e^{i\alpha} h_1 \\ h_1 & h_0 & \ddots & & & \ddots & \vdots \\ \vdots & & \ddots & \ddots & & & \rho e^{i\alpha} h_{L-1} \\ h_{L-1} & & & \ddots & \ddots & & 0 \\ 0 & \ddots & & & \ddots & \ddots & \vdots \\ \vdots & \ddots & \ddots & & & h_0 & 0 \\ 0 & \cdots & 0 & h_{L-1} & \cdots & h_1 & h_0 \end{bmatrix}. \quad (2)$$

This is a matrix with first column $[h_0, \ldots, h_{L-1}, 0, \ldots, 0]^T$, and subsequent columns are successive cyclic shifts of this column, with the upper triangular part of the matrix multiplied by $\rho e^{i\alpha}$.

Proposition 1: All $N \times N$ ($\rho, \alpha$)-circulant matrices are diagonalizable in the ($\rho, \alpha$)-Fourier basis $F_{N,(\rho,\alpha)}$ $$F_{N,(\rho,\alpha)} = F_N \mathrm{diag}\left(1, \rho^{\frac{1}{N}} e^{i\alpha \frac{1}{N}}, \ldots, \rho^{\frac{N-1}{N}} e^{i\alpha \frac{N-1}{N}}\right) \quad (3)$$

where $F_N$ is the Fourier Matrix of size $N$. The ($\rho, \alpha$)-circulant matrix $H$ is diagonalizable as follows $$\mathrm{diag}(\phi_0, \ldots, \phi_{N-1}) = F_{N,(\rho,\alpha)} H F_{N,(\rho,\alpha)}^{-1} \quad (4)$$

where the diagonal elements are given by the ($\rho, \alpha$)-DFT of the first column of $H$:

$$[\phi_0, \ldots, \phi_{N-1}]^T = F_{N,(\rho,\alpha)} [h_0, \ldots, h_{L-1}, 0, \ldots, 0]^T. \quad (5)$$

Proof: The proof is an adaptation of a proof of, Sec. 3.1, where the author characterizes the eigenvectors and eigenvalues of a circulant matrix. Given a ($\rho, \alpha$)-circulant matrix $H$, the eigenvalues $\phi_m$ and the eigenvectors $v_m$ of $H$ are the solutions of $$Hv = \phi v \quad (6)$$

This can be written in scalar form as the system of equations $$\sum_{k=0}^{\min(m,L-1)} h_k v_{m-k} + \rho e^{i\alpha} \sum_{k=m+1}^{L-1} h_k v_{N-(k-m)} = \phi v_m t, \quad (7)$$

$$m = 0, \ldots, N-1.$$

In (7), we apply the convention that the sum is zero if the lower bound is higher than the upper bound (for the second summation).

Let us assume $v_k = \}^k$ and replace it in (7). Cancellation of $\}^m$ yields $$\sum_{k=0}^{\min(m,L-1)} h_k \}^{-k} + \rho e^{i\alpha} \}^N \sum_{k=m+1}^{L-1} h_k \}^{-k} = \phi t, \quad (8)$$

$$m = 0, \ldots, N-1$$

Thus, choosing $\lambda$ such as $\rho e^{i\alpha} \lambda^N = 1$, we obtain an eigenvalue $$\phi \sum_{k=0}^{L-1} h_k \lambda^{-k} \quad (9)$$

and the associated (normalized) eigenvector is $$v = \beta [1, \lambda, \lambda^2, \ldots, \lambda^{N-1}]^T \quad (10)$$

with $\beta = 1/\sqrt{N}$ if $\rho = 1$ and $$\beta = \sqrt{\frac{1 - \frac{1}{|\alpha|^{1/N}}}{1 - \frac{1}{|\alpha|}}}$$

otherwise.

Then we can choose $\lambda_m$ as the complex N-th root of $\rho e^{-m}$, $$\lambda_m = \frac{1}{\rho^{1/N}} e^{-i\alpha/N} e^{2\pi i/N},$$

obtaining eigenvalue $$\phi_m = \sum_{j=0}^{L-1} h_j \rho^{\frac{1}{N}} e^{i\alpha \frac{j}{N}} e^{-2\pi i j \frac{m}{N}} \quad (11)$$

and eigenvector $$v_m = \beta \left[ 1, \frac{e^{-i\alpha \frac{1}{N}}}{\rho^{\frac{1}{N}}} e^{2\pi i \frac{m}{N}}, \ldots, \frac{e^{-i\alpha \frac{N-1}{N}}}{\rho^{\frac{N-1}{N}}} e^{2\pi i m \frac{N-1}{N}} \right] \quad (12)$$

such as $$H v_m = \phi_m v_m, m = 0, \ldots, N-1 \quad (13)$$

From (11), we can deduce immediately an inversion formula (analog to the inverse Fourier transform) to obtain the elements of the first column of H from the eigenvalues $$h_l = \frac{1}{\rho^{\frac{l}{N}}} e^{-i\alpha \frac{l}{N}} \frac{1}{N} \sum_{m=0}^{N-1} \phi_m e^{2\pi i m \frac{l}{N}}, \quad (14)$$

$$l = 0, \ldots, L-1$$

III. Model

A. OFDM

The cyclic prefix (CP) is used to suppress inter-symbol interference (ISI), and turn a frequency-selective channel into N flat fading parallel transmission channels. It enables to turn the linear convolution into a circular convolution.

In the regular OFDM scheme, the received signal r is $$r = HF^{-1}s + n \quad (15)$$

where s is the OFDM symbol sent by the mobile, n is Additive White Gaussian Noise with variance $\sigma^2$, and H is a circulant matrix as in (1). Therefore H is diagonalized in the Fourier basis F, with diagonal elements the discrete Fourier transform of the first column $[h_0, \ldots, h_{L-1}, 0, \ldots, 0]^T$. This is simply obtained by multiplying r in (15) with F. The distribution of the noise does not change, since a unitary transformation of a Gaussian vector is a Gaussian vector.

$$F \cdot r = \text{diag}\left( H(0), \ldots, H\left(\frac{N-1}{N}\right) \right) s + n \quad (16)$$

H(.) is the DFT of the first column of H.

$$H\left(\frac{m}{N}\right) = \sum_{j=0}^{L-1} h_j e^{-2\pi i j \frac{m}{N}}. \quad (17)$$

B. α-OFDM

The idea of α-OFDM is to multiply the samples of the cyclic prefix by $z = \rho e^{i\alpha}$ where we constrain $\rho$ to equal 1. In addition to this, the OFDM signal is multiplied by $\text{diag}(1, e^{-i\alpha/N}, \ldots, e^{-i\alpha(N-1)/N})$ after the IDFT in the OFDM transmission scheme. The latter is presented in FIG. 1 where we emphasized the system changes leading to α-OFDM. Thus α-OFDM represents only a minor change compared to OFDM, barely more than a vector product before transmission. OFDM is a particular case of α-OFDM with $\alpha = 0$. In fact, $\rho$ could be chosen different from 1 but this would then impose exponential weights on the successive time-domain OFDM samples (as the $k^{th}$ OFDM sample in every OFDM symbol would be weighted by a factor $\rho^k e^{-i\alpha k/N}$). By doing so, an unwanted selection of "important" samples is made, which would deteriorate the BER at the reception.

The received signal r is therefore $$r = H F_\alpha^{-1} s + n \quad (18)$$

where $F_\alpha$ is a simpler way to express $F_{(1, \alpha)}$.

This time H is α-circulant (meaning that H is $(1, \alpha)$-circulant). It can be diagonalized in the α-Fourier basis, $$F_\alpha = F_{(1,\alpha)} = F \cdot \text{diag}(1, e^{-i\alpha/N}, \ldots, e^{-i\alpha(N-1)/N}) \quad (18)$$

This is barely obtained by multiplying r in (18) with $F_\alpha$. The distribution of the noise does not change, since a unitary transformation of a Gaussian vector is a Gaussian vector.

A particularly practical application of α-OFDM is obtained for $\alpha \in 2\pi\Delta$. Considering a couple of integers (k, M) such that $\alpha = 2\pi k/M$, we can write $$F_\alpha r = \text{diag}\left( \Phi(0, k), \ldots, \Phi\left(\frac{N-1}{N}, k\right) \right) s + n. \quad (19)$$

$\Phi(., k)$ is the α-DFT of the first column of H:

$$\Phi\left(\frac{m}{N}, k\right) = \sum_{j=0}^{L-1} h_j e^{2\pi i \frac{k}{M} \frac{j}{N}} e^{-2\pi i j \frac{m}{N}} \quad (20)$$

The important result to be captured at this point is that $\Phi(., k)$ is actually a mere frequency shifted version of H. Thus α-OFDM introduces a seemingly circular frequency offset $\phi_{(H, \Phi(., k))}$ to the channel H as shown in FIG. 2.

$$\phi_{(H,\Phi(.,k))} = 2\pi \frac{k}{NM} \qquad (21)$$

In the particular case when M|N, this frequency offset corresponds to an integer number l=k/MN of subcarrier spacings, leading then to $$\forall m \in [0, N-1], \Phi(m,k) = H(m-1) \bmod N \qquad (22)$$

In the following, we shall always assume a of the form $2\pi k/M$

IV. Outage Capacity

A. Introduction

Burst-packet mode achievable rates cannot be evaluated with Shannon's formulation of the ergodic capacity that involves continuous transmission. The upper bound for those rates is usually measured as the rate that is surely achieved 100(1−q) % of the time. This rate $C_0$ is known as the 100q %-outage capacity $$\Pi(C > C_0) = 1 - q$$

where C is the fixed-channel capacity derived from Shannon's capacity formulation [4] for fixed channels that is studied hereafter.

B. OFDM Capacity

In classical OFDM systems using $N_u$ useful subcarriers (over N total subcarriers), the normalized capacity C (also called spectral efficiency) for the fixed channel $H \xrightarrow{\mathcal{F}} H$ is given by $$C = \frac{1}{N_u} \sum_{m=0}^{N_u-1} \log\left(1 + \frac{\left|H\left(\frac{m}{N}\right)\right|^2}{\sigma^2}\right). \qquad (24)$$

C. α-OFDM Capacity

As for α-OFDM, by using the derivations of section III-B, the capacity for the fixed-channel situation is computed as $$C_a = \frac{1}{N_u} \sum_{m=0}^{N_u-1} \log\left(1 + \frac{\left|\Phi\left(\frac{m}{N}, k\right)\right|^2}{\sigma^2}\right). \qquad (25)$$

D. α-OFDM-Based Systems

The idea behind α-OFDM is its possibility to explore the allocated bandwidth on any subset of equidistant subcarriers, depending on α. This appears particularly relevant in a channel diversity point of view if integrated into a scheme that regularly changes the value of α. In short, this can be seen as a symbol-by-symbol diversification of the subcarriers in use.

Therefore we naturally introduce the α-OFDM#1 scheme.

α-OFDM#1 assumes that a particular "shift-pattern"

$$\mathcal{M} = \left\{0, e^{2\pi i \frac{1}{M}}, \dots, e^{2\pi i \frac{M-1}{M}}\right\} \qquad (26)$$

of M rotation values is shared and a priori known to the transmitter and the receiver. Inside a burst block-fading, where the channel is supposed to be almost constant, every symbol $x_i$ of duration T is sent at time $t=t_0+i\cdot T$ as an $\alpha_{(i \bmod M)}$-OFDM symbol.

To ensure the channel stability along M successive α-OFDM symbols, M is chosen sufficiently small (usually M≤8). α-OFDM#1 capacity is then derived on a useful subcarrier basis as $$C_{\#1} = \frac{1}{MN_u} \sum_{m=0}^{N_u-1} \sum_{\alpha \in \mathcal{M}} \log\left(1 + \frac{\left|\Phi\left(\frac{m}{N}, k\right)\right|^2}{\sigma^2}\right). \qquad (27)$$

where k is linked to the mute variable α by the relation k=αM. The whole system capacity C ($\mathcal{W}_u$) of bandwidth $\mathcal{W}$ and useful bandwidth $\mathcal{W}_u = \mathcal{W} \cdot N_u/N$ Wu=W·Nu/N is therefore given by $$C^{(\mathcal{W}_u)} = \mathcal{W} \cdot C_{\#1} \qquad (28)$$

V. Discussion

A. Spectral Efficiency

As already stated, one of the most important achievement of OFDM lies in its spectral efficiency. Indeed, in a communication system where data are fed through a channel of spectral response H and noise variance $\sigma_n^2$, restricted to a bandwidth $\mathcal{W}$, the instanteneous channel capacity with no Channel State Information at the Transmitter (CSIT) is defined as $$C^{\text{eff}} = \int_{-\mathcal{W}/2}^{\mathcal{W}/2} \log_2\left(1 + \frac{1}{\sigma_n^2} |H(f)|^2\right) df. \qquad (29)$$

The channel efficiency of a system can then be defined as the ratio between its actual capacity over $C^{\text{eff}}$.

The channel spectrum can approximately be divided in subbands of size $B_c$, the coherence bandwidth defined as the inverse of the RMS delay spread of the channel impulse response H. On any subband of size $B_c$, the channel spectrum is almost constant and thus $$C^{\text{eff}} = \int_{-\mathcal{W}/2}^{\mathcal{W}/2} \log_2\left(1 + \frac{1}{\sigma_n^2} |H(f)|^2\right) df; \qquad (30)$$

$$B_c \cdot \sum_{i=0}^{\mathcal{W}/B_c} \log_2\left(1 + \frac{1}{\sigma_n^2} |H(-\mathcal{W}/2 + i \cdot B_c)|^2\right); \qquad (31)$$

$$\frac{\mathcal{W}}{N} \cdot \sum_{i=0}^{N-1} \log_2\left(1 + \frac{1}{\sigma_n^2} |H_i|^2\right) \qquad (32)$$

where $$N = \left\lceil \frac{\mathcal{W}}{B_c} \right\rceil \text{ and } H_i = H(-\mathcal{W}/2 + i \cdot B_c).$$

This last equation is exactly the formulation of an OFDM-like system. In fact, since the RMS delay spread of the channel impulse response is little with respect to the OFDM symbol duration, the subcarrier spacing (corresponding to the inverse of the symbol duration) is small compared with $B_c$ and therefore, in the OFDM case, the approximated equality relation of the equations hereafter is actually close to an equality.

This means that OFDM realizes almost full spectral efficiency over the allocated bandwidth. As a consequence, any attempt to increase the spectral efficiency would lead to no significant gain. This proves that α-OFDM schemes, in no-CSIT situations are of no use.

FIG. 3 shows a typical long channel OFDM situation where the coherence bandwidth $B_c$ is of the same order as the subcarrier spacing. Therefore very little channel diversity can be gained here by α-OFDM (where the dark bars do not fit the light bars). Still, this situation cannot be extended to longer channels, or else every subcarrier would face non-flat fading, leading to non-memoryless subchannels and then ISI (the channel RMS delay spread being then longer than the CP).

Nonetheless, let us assume that we deal with an OFDM modulated system that only exploits part of its subcarriers, leading therefore to instantly using a restricted bandwidth $\mathcal{W}$ √$\mathcal{W}$ and let us then assume that somehow we can dynamically use different sets of those subcarriers (all sets of cumulated bandwidth $\mathcal{W}$). For instance, we can assume that we are allowed to "leak data" on the bandwidth sides on an oversampled OFDM system. Then we could benefit from channel diversity if we could send consecutive OFDM symbols on different subbands of size $\mathcal{W}$ contained in the whole $\mathcal{W}$ spectrum.

B. Outage Capacity Gain

The purpose of the schemes based on α-OFDM is to close the outage capacity performance gap between the complete channel usage offered by OFDM (exploiting all the subcarriers) and the subchannel usage offered by OFDM with a restricted set of useful subcarriers. We can actually show that this gap can be completely filled thanks to α-OFDM#1 in the SISO-OFDM case.

Lemma 1: Let us consider a SISO-OFDM system with $N_u$ useful subcarriers out of a total of N subcarriers and symbol period T without channel knowledge on the transmitter side.

Applying an α-OFDM#1 scheme with size-M shift-pattern $$\mathcal{M} = \left\{0, e^{2\pi i \frac{1}{M}}, \ldots, e^{2\pi i \frac{M-1}{M}}\right\} \tag{33}$$

such that α ∈ 2πN and N|{M·GCD(N, $N_u$)}. Then, assuming the channel coherence time $T_{coh}$ respects $T_{coh}$=M·T, the instanteneous capacity Cmax per subcarrier is maximized and expresses as $$C_{\#1}^{max} = \frac{1}{N}\sum_{m=0}^{N-1} \log\left(1 + \frac{\left|H\left(\frac{m}{N}\right)\right|^2}{\sigma_n^2}\right). \tag{34}$$

Proof: For any α-OFDM#1 structure, the capacity derives $$C_{\#1} = \frac{1}{MN_u}\sum_{m=0}^{N_u-1}\sum_{a\in\mathcal{M}} \log\left(1 + \frac{\left|\Phi\left(\frac{m}{N}, k\right)\right|^2}{\sigma^2}\right) \tag{35}$$

On an M OFDM-symbol frame with α kept a multiple of 2π, every subcarrier $H_i$ is used an integer number of times $\lambda_i$.

This allows to rewrite $C_{\#1}$:

$$C_{\#1} = \frac{1}{MN_u}\sum_{m=0}^{N-1} \lambda_m \log\left(1 + \frac{\left|H\left(\frac{m}{N}\right)\right|^2}{\sigma_n^2}\right) \tag{36}$$

with $$\sum_{m=0}^{N-1} \lambda_m = M \cdot N_u.$$

The variable change $$\beta_m = \frac{N\lambda_m}{MN_u}$$

leads to $$C_{\#1} = \frac{1}{N}\sum_{m=0}^{N-1} \beta_m \log\left(1 + \frac{\left|H\left(\frac{m}{N}\right)\right|^2}{\sigma_n^2}\right) \tag{37}$$

$$\leq \frac{1}{N}\log\left(\sum_{m=0}^{N-1} \beta_m\left(1 + \frac{\left|H\left(\frac{m}{N}\right)\right|^2}{\sigma_n^2}\right)\right) \tag{38}$$

$$= \frac{1}{N}\log\left(N + \sum_{m=0}^{N-1} \beta_m \frac{\left|H\left(\frac{m}{N}\right)\right|^2}{\sigma_n^2}\right) \tag{39}$$

by concavity of the log function.

Let us fix the $\beta_m$'s. Then, with no knowledge of the channel, the expression (40) is minimized when $$\sum_{m=0}^{N-1} \beta_m \left|H\left(\frac{m}{N}\right)\right|^2$$

is minimum. With no channel knowledge, one has to assume that H(.) is always null but in $m_{min}$ where $m_{min}$=arg $\min_m \beta_m$, thus minimizing the sum.

This being said, the best $\beta_m$ allocation is to maximize $\min_m \beta_m$ with sum $\Sigma_m \beta_m$=N. This leads to ∀m ∈ [0, N−1], $\beta_m$=1. This is the equality case of equation (39) which is achievable when N|{M·GCD(N, $N_u$)}, hence the result.

This result extends to the situation when the channel is known to the transmitter. In the latter, water-filling can be applied on the size-M frame in order to meet the optimal capacity of the full (subcarriers) OFDM case.

VI. Simulation and Results

In this section, not only do we provide some implementation results using α-OFDM but we also intend to open new spaces of discussions where α-OFDM-based techniques could lead to significant outage performance gain.

3GPP-LTE OFDM design is targetted in most simulations. We especially present results for the 1.25 MHz bandwidth ($N_u$=76, N=128) and the 10 MHz bandwidth ($N_u$=602, N=1024). In LTE, the Null SubCarriers (NSC) on the bandwidth sides do not correspond to guard bands but to a consequence of oversampling at the receiver; as a result, the N−$N_u$ NSC correspond to a leakage of OFDM over occupied side bands. We shall study here the outage capacity and BER gain assuming that we were allowed to slide the spectrum over those bands while still sending data on $N_u$ consecutive (in modulo N sense) subcarriers. Channels are either theoretical complex exponential decaying channels of mean zero and variance one or LTE standardized channels [11]

Extended Pedestrian A model (ETA), with RMS delay spread 43 ns

Extended Vehicular A model (EVA), with RMS delay spread 357 ns

Extended Typical Urban model (ETU), with RMS delay spread 991 ns

Also, in the following, we introduced a second α-OFDM based scheme, namely α-OFDM#2 which assumes perfect CSIT and which, instead of rotating over a set of α's, selects the best subband of size Wu in the W bandwidth and keeps sending data over this band.

A. SISO Case

FIG. 4 compares the outage capacity gain effect of α-OFDM#1 against plain OFDM in LTE EPA channels for shiftpattern of length M=2 and M=8 for the LTE 1.25 MHz bandwidth case. The important result to be caught here is the strong SNR gain brought by α-OFDM#1 already for M=2 (SNR gain of +1.1 dB), while growing M does not bring much improvement. This can actually be generalized as a rule of thumb: by defining the channel diversity gain as $\mathcal{W}/\mathcal{W}$, α-OFDM#1 with M=$\lceil \mathcal{W}/\mathcal{W} \rceil$ almost fulfills the achievable outage capacity gain. Also, it is worth noticing that this gain is dependant on the channel length (it can be shown that EVA channels show up to 1.3 dB gain while ETU do not overtake the 0.4 dB gain limit) but only to a certain extent (EPA have a smaller order but still realizes a gain comparable to EVA).

A complete (uncoded) α-OFDM#1 chain was designed under Matlab that shows corresponding decrease in outage BER, as shown in FIG. 5 that presents results obtained for BPSK signaling and MMSE decoding over Rayleigh channels with M=2 and M optimal. As previously stated, M=2 already provides a great improvement so that the optimal gain in BER shows a close behaviour.

B. Single User with Multiple Antennaes

As shown in FIG. 7, that depicts the gain of α-OFDM schemes versus OFDM in Rayleigh channels using multiple antennaes at the transmitter, the usage of additional antennaes can be partially or fully prevented using α-OFDM schemes.

This can be seen as a transfer of diversity from the space domain (ie, the antennaes) to the "α-domain" which helps the system to quickly capture different channel conditions instead of facing a unique constant (possibly deep fading) channel. In this particular situation, it is possible, assuming perfect channel state feedback to the transmitter (CSIT) to use only two transmitting antennaes with the same efficiency as four antennaes in classical OFDM without CSIT. This seemingly amazing result requires deeper attention. Indeed, the performance gain, which can actually be broadly generalized to the whole study, is highly dependent on the definition of the "outage" channel. Indeed, as a ground rule for performance comparison, one usually takes the 1% outage typical channels as a reference. Those channels lead to the capacity value that at least achieved 99% of time. Depending on the importance of the minimum achievable capacity, one might want to consider instead the 0.1% or the 0.01% outage capacity . . . . In those circumstances, the typical outage channels are so bad (in fading terms) that α-OFDM diversity scheme provides an even better gain, as it becomes less and less probable that two adjacent subchannels instanteneously face very bad conditions. In [17] and [12], proper definitions of outage conditions are discussed.

the channel typical length. When the channel is short (ie, almost flat over the effective bandwidth), outage channels merely correspond to very low almost uniformly flat power channels so that, again, exploiting subsequent subchannels should lead to an appreciable outage capacity increase. But when the channel is typically long (at most as long as the CP length), then it is said to be frequency selective and already provides in itself an important diversity. In those conditions, typically achieved outage capacities are not far from the ergodic capacity and α-OFDM schemes do not provide much more gain.

As a consequence, in mobile short distance wireless communication schemes where important packets are sent over very short-time bursts, any fast diversity scheme such as α-OFDM proves very efficient and might prevent the usage of a subsidiary antenna.

This will typically be the case when the compound outage channel $(H_0, \ldots, H_{k-1})$ of the size-K antenna array working under classical OFDM achieves lower capacity than the the compound outage channel $(H_{i_0}, \ldots, H_{i_{L-1}})$ working under α-OFDM, for a given L<K and for given $\{i_0, \ldots, i_{L-1}\} \in [0, K-1]$. This can be written, for a fixed q % outage probability C0 of the classical OFDM scheme, as: $\dashv$L<K, $$P(C_{\{H_0,\ldots,H_{k-1}\}} > C_0) < P(C_{\alpha,\{H_0,\ldots,H_{k-1}\}} > C_0) \quad (41)$$

meaning that, for a given q % outage, α-OFDM is a better channel diversifier with only L antennas compared to classical OFDM with K antennaes.

C. Multi-Cell Systems

In recent distributed MIMO-OFDM technologies, since high-end techniques such as beamforming at the base stations or network-wide interference coordination become available, inter-cell spectrum repartition typically targets a frequency reuse factor of 1. This means that two adjacent cells share the same bandwidth. Even if we tend to mitigate inter-cell interference, there still are situations when the User Equipment (UE in the 3GPP terminology) faces a high inter-cell interference which, in that case, is very detrimental to the capacity performance. In an outage point of view, this typically happens whenever the UE's own cell shows bad channel conditions while the channel from the UE to the interferer is strong.

Thanks to α-OFDM, not only will the UE diversify its own channel but it will also face different interference patterns. Therefore, it is even less likely for it to simultaneously face bad own channel conditions and strong interference over the M α-OFDM symbols. FIG. 6 provides this analysis, in which a UE faces interference under constant SNR level (kept to 15 dB) and varying Signal-to-Interference Ratio (SIR). Channel length is set to three OFDM samples while $N_u$=601 and the FFT size is N=1024 subcarriers. At high SIR, one can find the already discussed α-OFDM capacity gain for SNR=15 dB. But the important result to be captured here is that, around SIR=20 dB (a level for which interference becomes a relevant factor), the outage gain of α-OFDM#1 is around more than 3 dB, which doubles the gain achieved in interference-free conditions.

Again, as discussed in the previous section, those gains are even more accentuated if the considered outage were less than 1% and gets lessened for more frequency selective channels.

VII. Applications

All along this study, on the specific example of the 1.25 MHz band for LTE, we assumed that we were allowed to use extra band on the edges to capitalize on channel diversity. But this assumes that those bands are not in use. In the following we propose schemes for service providers to overcome this problem by sacrificing a small part of the total bandwidth.

A. α-LTE

In LTE context, service providers are allowed to use up to 20 MHz bandwidth that they can freely subdivide in, say, 16 chunks of 1.25 MHz. Those chunks are composed of 76 subcarriers each and work on an oversampled 128-FFT. We propose here to sacrifice an amount of 4 subcarriers per chunk that then results in a 4×16=64 free band that we split in two 32 subcarrier-band on the 20 MHz edges. By synchronously using α-OFDM on every chunk, we can design a system of Nu=76−4=72 effective subcarriers over a total N=72+16×4=136 subcarriers.

FIG. 8 provides a visual interpretation for a total band divided into 4. In this particular example, an M=3 α-OFDM-based scheme can be used that synchronously exploits the left Nu subcarriers of the red-dotted part of each chunk, then the central Nu subcarriers and finally the right Nu subcarriers in any three consecutive OFDM symbols ($s^{(3k)}, s^{(3k+1)}, s^{(3k+2)}$). Therefore, data will always be sent on individual and non-overlapping bandwidths. In our particular example, we use a 136-DFT for a signal occupying the central 72-subcarrier band. Of course 136-DFT would not be a smart DFT choice for computational reasons; our intention here is merely to show the theoretical gain provided by this subtle change in the standard.

The gain of α-LTE lies in outage BER and also in low-to medium SNR outage capacity. Indeed, the lack of 4 subcarriers introduces a factor 72/76 on the outage capacity C derivation that highly reduces the performance at high SNR, since $$C_{SNR} \underset{SNR \to \infty}{\sim} N_u \log(SNR) \tag{42}$$

But at low-to-medium SNR, the gain discussed in section IV appears and may overtake (depending on the channel characteristics) the loss in outage capacity induced by the loss of subcarriers. As for the outage BER that was computed out of a mere MMSE detection scheme over BPSK signaling, whatever the SNR, it shows better performance than the former OFDM system, that translates into constant SNR gain at medium-to-high SNRs.

FIG. 9 provides the experimental results obtained in 1% outage capacity gain for a transmission through 3GPP-EVA channels with $N_u$=72, N=136 in low-to-medium SNR region. For fair comparison, we plotted here the outage capacity cumulated over a bandwidth of 76 subcarriers (therefore, when $N_u$=72, 4 transmission subcarriers are emptied) that we divide by this amount of bandwidth (ie, 76$\Delta_f$ with $\Delta_f$ the subcarrier spacing). As stated before, at low-to-medium SNR values, we see a positive gain in capacity even with the sacrifice of 4 subcarriers. At high SNR, we can observe that the 76 subcarrier-OFDM progressively fills the gap between itself and our improved method. Of course, this gap would be filled for lower SNR if the channel length increases or if the transmission time becomes larger than the coherent time of the channel. This is another compromise to take into consideration for proper use of α-OFDM.

B. Generalization of α-LTE

3GPP LTE is not the only scheme to divide its allocated bandwidth into many OFDM systems. Typically, UWB systems, that cannot manage very large FFT (for computational reasons or for sampling complexity), divide their allocated bandwidth into successive OFDM chunks. Therefore α-LTE can be generalized to systems that are allocated a total bandwidth $W_u$ of N subcarriers that is subdivided into K chunks. In classical OFDM, this results in chunks of size N/K and therefore, without oversampling, a DFT size of N/K.

While, by using an α-OFDM-based scheme, we introduce a guardband of G subcarriers, to result in K chunks of size (N−G) that work under an ((N−G)/K+G)−FET. By making (N, K) grow to infinity with a constant ratio, each chunk works under a seemingly (N/K+G)−FET with N/K useful subcarriers. The loss in outage capacity per chunk at high SNR is then fairly reduced while the gain in outage BER per chunk is kept constant whatever (N, K).

A very interesting point should be raised here in that α-OFDM, in order to accomplish outage gain, does not necessitate any "Excess Bandwidth" (that we define as any type of excess dimension such as time, bandwidth, space . . . ). All the useful diversity information is already present in the system.

C. Multiplexing Gain by Channel Sensing

Most OFDM systems are allowed a given amount of bandwidth $W$ that, due to non-ideal filtering, are not used entirely. The classical approach is to use frequency guard-bands on FFT edges, by setting a certain amount of subcarriers to null. Say the OFDM system under consideration is actually an α-OFDM system working here under a constant α=0 mode. Advanced techniques of channel sensing allow to figure out the spectral occupation of the neighbouring bandwidth. For bursty systems, it could be convenient to reuse this excess bandwidth We. By growing the shift-pattern accordingly (and therefore move to another model, for instance $\alpha \in \{0, 2\pi N W / W\}$, it is possible to dynamically gain in channel multiplexing. The receiver equipment can be dynamically informed of the mode to be used in a few bits of the first OFDM symbol of the burst.

VIII. Conclusion

In this paper, a novel generalization of OFDM called α-OFDM that allows to exploit large bandwidths and thus obtain outage gain for bursty OFDM systems, is introduced. α-OFDM represents a minor change in OFDM standard and offers very little capacity improvement in its raw usage because we saw that OFDM is a spectral efficient modulation. Nevertheless α-OFDM provides an easy way to exploit potentially usable side bandwidths, that show interesting outage capacity improvement compared to pure OFDM. In multi-cell scenarios, α-OFDM can be exploited to mitigate the inter-cell interference effect produced by neighbouring users. Also, Single User MISO theoretical outage capacity gain is presented that show that α-OFDM schemes may be used to efficiently replace extra antennaes at the transmitter when the channel conditions and the usable extra bandwidth are favorable. A large panel of usage can be derived from α-OFDM such as α-LTE, a novel evolution of LTE standard also introduced in this paper and that proves more efficient in packet-switch and short channel conditions. In this particular context, α-OFDM capitalizes on no excess dimension whatsoever but still proves more efficient than plain OFDM. α-OFDM coupled to channel sensing methods also suits to future generation communication systems (ie, Cognitive Radio systems [13]) that intend on smartly exploiting excess bandwidth.

EMBODIMENTS

1st Embodiment

The change compared to previous classical OFDM is required to be aware of the α-circulant matrices properties, which was barely used in the past. The concrete changes come as follow, In the transmission chain (see FIG. 1)
the Frequency domain input symbol (ie, the OFDM symbol) to be transmitted is processed by an α-Fourier Inverse Transform instead of the regular Fourier Transform. This does not require involved techniques, just an additional product on the output of the regular Inverse Fast Fourier Transform (IFFT) module.
before CP addition, the CP symbols are rotated by a constant α value.

In more detail, the N data symbols that constitute the α-OFDM symbol to be transmitted are fed to a novel α-IDFT block which
takes a length N vector s as input.
output a length N vector x as output where $$x = F_{N,\alpha}^H s$$
$$= [F_N \text{diag}(1, e^{i\alpha \frac{1}{N}}, \ldots, e^{i\alpha \frac{N-1}{N}})]^H s$$

where $F_N$ is the size N DFT matrix with entries $$F_{m,n} = e^{-2\pi i \frac{nm}{N}}.$$

The $N_L$ first symbols of x are then multiplied by $e^{i\alpha}$ (they form the novel α-Cyclic Prefix) and concatenated to x to form the extended vector $$x_{ext} = [e^{i\alpha} x_1 e^{i\alpha} x_1 \ldots e^{i\alpha} x_1 e^{i\alpha} x_{N_L} x_1 x_2 \ldots x_N]$$

This data is then sent through to the RF transmission device.

In the reception chain the time-domain OFDM symbol, after CP removal, is being processed by an α-Fourier Transform instead of the regular Fast Fourier Transform (FFT).

In more detail, at reception, the $N_L$ first incoming symbols (ie, the cyclic prefix) are removed and the remaining z of the incoming data is processed through a novel α-DFT block which
takes a length N vector y as input.
output a length N vector z as output where $$z = F_{N,\alpha} y$$
$$= F_N \text{diag}(1, e^{i\alpha \frac{1}{N}}, \ldots, e^{i\alpha \frac{N-1}{N}}) y$$

where $F_N$ is the size N DFT matrix with entries $$F_{m,n} = e^{-2\pi i \frac{nm}{N}}$$

The vector z is then sent to the inner-receiver to be further processed by classical blocks.

The modified α-Fourier-Transformation as explained above generates a shift in frequency for subcarriers. From this scheme, we can derive system-level schemes that help to gain on channel diversity by using different α values. Especially, we will discuss two schemes here:

α-OFDM#1 is a scheme that uses a sequence of M different α values ($\alpha_1, \alpha_2, \ldots, \alpha_M$). Those values are successively used to modulate the signal to be sent. This of course requires some synchronization at the receiver to know at startup what α is being used for transmission. By exploiting neighbouring bandwidths with little change in the OFDM modulation, this scheme allows, for high M values to achieve the optimal channel diversity available on the whole bandwidth being used along M successive transmissions. This significantly improves the channel outage capacity (that was tested for 3GPP-LTE channels) as well as outage BER while using the same bandwidth width at any transmission instant (but using a larger total bandwidth on M consecutive instants). More details on this topic are explained in the other parts of this paper.

The α-OFDM#1 scheme is a completely novel scheme, based on α-OFDM.

In more detail, α-OFDM#1 assumes that a particular "shift-pattern" $\mathcal{M}$ given by $$\mathcal{M} = \{0, e^{2\pi i \frac{1}{M}}, \ldots, e^{2\pi i \frac{M-1}{M}}\}$$

this shift pattern is assumed to be known both at the transmitter and the receiver. Any sequence of M successive α-OFDM symbols to be sent works as
the first α-OFDM symbol $s_1$ is sent using $\alpha_1$-OFDM.
the second α-OFDM symbol $s_2$ is sent using $\alpha_2$-OFDM.
and so on and so forth
the $M^{th}$ α-OFDM symbol $s_M$ is sent using $\alpha_M$-OFDM.
the $(M+k)^{th}$ α-OFDM symbol (for k>0) $s_M$ is sent using $\alpha_{(k \bmod M)}$-OFDM, where the operator mod is the modulo operator.

α-OFDM#2 is a scheme that chooses a constant α among the M available ($\alpha_1, \alpha_2, \ldots, \alpha_M$) of the α-OFDM#1 scheme. This constant α is chosen to be the one for which the outage capacity or outage BER is optimal. This is more difficult to implement because it requires Channel State Information at the Transmitter which is unlikely to be available in short-time packet-switched networks. The α-OFDM#2 scheme is a completely novel scheme, based on α-OFDM.

α-OFDM#2 is a particular case of α-OFDM#1 for which M is restricted to M=1 and then α is constant all along the communication. In this case, the α value is chosen by the transmitter to be the most appropriate and is shared to the receiver.

The performance gains of α-OFDM#1 or α-OFDM#2 are null in terms of ergodic capacity or ergodic BER (typical performance criterion for circuit-switched long transmissions) but appear when considering packet-switched with short transmission time networks. These are:
gain in outage capacity: up to 2 dB gain in 3GPP-EPA channels.
gain in outage BER: also up to 2 dB gain in 3GPP-EPA channels.
when considering interfering cells, the asymptotic high Signal to Interferer Ratio (SIR) gain is measured in terms of capacity increase of a few bits/s/Hz.
when considering low outage situations (0.001 or 0.0001 instead of 1% outage), then the gains are even larger, which is typically desirable for safe transmission systems.
in low outage, it can even been shown that extra antenna addition at the transmitter (used for channel diversification) can be avoided thanks to α-OFDM.

2$^{nd}$ Embodiment

α-OFDM is a generalization of the well-known Orthogonal Frequency Division Multiplexing (OFDM) technique.

This scheme introduces small changes to the previous OFDM system but can still prove to provide great outage capacity as well as outage BER improvements when used appropriately.

In this embodiment we provide a generic solution for OFDM systems that are allocated a very large bandwidth (such as 3GPP-LTE, 802.16 WiMax and more particularly UWB) so that they have to share the bandwidth into multiple subbands, each of which being an independent OFDM block. Such systems are known as Multicarrier OFDM. This solution is based on α-OFDM and allows short-time packet-switched systems that require highly assured performance to gain on outage capacity (that is the capacity achieved 99% on the time) and outage BER (that is the Bit Error Rate achieved 99% of the time). Therefore, in the following a Multicarrier α-OFDM is introduced.

The basic principle that makes Orthogonal Frequency Division Multiplexing (OFDM) work is based on the time-frequency transform (ie, Discrete Fourier Transform) that turns the time-domain non-memoryless channel into a frequency-domain memoryless (flat fading) channel. This is realized thanks to the Cyclic Prefix (CP) added as a last encoding step at the transmitter system that makes the channel matrix circulant. α-OFDM is based on the generalization of those circulant matrices that we called α-circulant.

Thanks to small changes, those matrices enjoy the same properties as OFDM so that α-OFDM can be used in the same manner as OFDM. Therefore, because of the increased flexibility (in the frequency subcarrier allocation), α-OFDM can be used in system-level schemes to significantly increase the outage capacity (that corresponds to the transmission rate achievable 99% of the time) as well as the outage BER (that corresponds to the reception Bit Error Rate achievable 99% of the time) in burst-packet systems that are quite demanding in outage performance.

Typically, in packet-switched systems (such as Internet, 3GPP-LTE, 802.16 WiMax . . . ), it is important to increase the outage performance to assure a constant high rate low-BER transmission.

Multicarrier OFDM is typically used in very large band systems such as UltraWide Band (UWB) that, if they worked as pure OFDM, would require very large (I)FFT computations. This would therefore lead to huge processing, which does not suit low computational performance systems such as mobile handsets. As a consequence, dividing the bandwidth into many OFDM subbands is a well-known solution. In multi-user design, users are typically required to work on a specific fixed band. This band can of course be subject to deep channel fading, therefore leading to low outage performance.

In this embodiment we introduce a direct application of α-OFDM that allows, at the price of a small bandwidth loss, to increase both outage BER and outage capacity when the channel is typically short in every subband (which is desirable for OFDM to work at highest capacity). This novel application would be named Multicarrier α-OFDM.

In the following, a quick technical introduction is provided, then the changes to current technologies are highlighted, some figures of performance are then derived and a full description of the system implementation is detailed.

The fundamentals of α-OFDM are explained above. The main inspiration of this embodiment comes from the fact that in recent OFDM-based systems, the encoding and decoding Fast Fourier Transform (FFT) used respectively at the transmission and at the reception is typically longer than the number of subcarrier effectively used. For instance, in LTE, a 128-size FFT is used to recover 76 data symbols (corresponding then to 76 useful subcarriers). The remaining 52 unused subcarriers are part of the adjacent bandwidth.

Since the adjacent bands are part of the global system, these are somehow available to the user. The idea behind the Multicarrier α-OFDM is to dynamically reuse those sidebands to quickly gain (quickly here means "from an OFDM symbol to the next") on channel diversity.

Typical known schemes aiming at channel diversity such as frequency hoping require high-level complex scheduling and typically set the same frequency band to every user for tens to hundreds of OFDM symbols.

In this contribution we propose to have a simple physical layer system (α-OFDM) that manages itself the frequency reuse of the side-bands in addition to this frequency hoping scheme. This generates even more channel diversity and is very desirable in short-time important transmission for which no frequency hoping is expected (since the packet length is too short).

A quick description of how this scheme works is described as follows,

- the system is allocated a bandwidth $\mathcal{W}$.
- from this bandwidth we reserve two small guard bands of size $\mathcal{G}$ each on the edges. Let us notice at this point that $\mathcal{G}$ can be chosen with no respect to the subcarrier spacing for instance.
- the remaining bandwidth is then cut into K chunks. Each chunk being a virtual OFDM carrier.
- each user is associated one of those chunks and works at reception a FFT size as large as the OFDM carrier (chunk) width plus twice the size of the guardband $\mathcal{G}$.
- by alternatively (from OFDM symbol to OFDM symbol) rotating over a set of 3 α values, the data associated to one user are taken from the left part of the FFT block, then the central part and finally the right part.

This creates high-rate channel diversification and allows for higher outage capacity as well as higher outage BER provided that the compromise "short $\mathcal{G}$ (to avoid large per-user bandwidth loss)/big K" is properly set.

A further analysis of this system as well as specific examples to the 3GPP-LTE case are described above. Asymptotical performance for large fastly growing K and $\mathcal{W}$ while slowly growing $\mathcal{G}$ is also provided.

FIG. 8 illustrates the typical example of the multicarrier OFDM setting with K=4 chunks.

The changes between Multicarrier α-OFDM and the classical Multicarrier OFDM reside in

- the guard bands of size $\mathcal{G}$ that are required on the bandwidth ($\mathcal{W}$) edges while none was requested for Multicarrier OFDM.
- the α-OFDM scheme that is used instead of plain OFDM. This scheme is very specific and uses the shift pattern $$\mathcal{M} = \left\{0, e^{2\pi i \frac{\mathcal{G}}{\mathcal{W}}}, e^{-2\pi i \frac{\mathcal{G}}{\mathcal{W}}}\right\}$$

the FFT size of the system must be at least as large as while in Multicarrier OFDM, a $$\frac{\mathcal{W}}{K} FFT$$

size was sufficient.

Summarizing, the main features of Multicarrier α-OFDM are

- the system work on a total allocated bandwidth $\mathcal{W}$
- a fixed amount of frequency space is isolated on the extreme low frequency and the extreme high frequency part of $\mathcal{W}$. Those two bands $\mathcal{G}$ and $\mathcal{G}$ can be taken the same, in which case $\mathcal{G} = \mathcal{G} = \mathcal{G}$
- Alternatively one of the two bands can be restricted to 0 Hz.
- the band $\mathcal{W} - \mathcal{G} - \mathcal{G}$, corresponding to the remaining of the frequency band, is cut into K non-necessarily equal-size subbands $\mathcal{W}, \mathcal{W}, \ldots, \mathcal{W}_K$.
- at any time instant ti, all bands will be sent data with the same $\alpha_i$-OFDM modulation of size $\mathcal{W}_i + \mathcal{G} + \mathcal{G})/\Delta_f$ (where $\Delta_f$ is the subcarrier spacing chosen accordingly).
- a shift-pattern $\mathcal{M} = \{\alpha_0, \alpha_1, \alpha_2\}$ of size 3 (unless one of $\mathcal{G}$ or $\mathcal{G}$ is null, in which case $\mathcal{M}$ is of size 2 is used to transmit the successive α-OFDM symbols $s_{t_1}, s_{t_2}, s_{t_3}, \ldots$ Specifically, the α-OFDM symbols $s_{t_n}$ is modulated by an $\alpha_{n \, mod \, M}$-OFDM modulation. $\mathcal{M} = \{\alpha_0, \alpha_1, \alpha_2\}$ is exactly defined as $$\mathcal{M} = \left\{ 0, e^{2\pi i \frac{\mathcal{G}}{\mathcal{W}}}, e^{-2\pi i \frac{\mathcal{G}}{\mathcal{W}}} \right\}$$

(the order of the terms in M may actually vary).

The performance gain by Multicarrier α-OFDM is highly dependend on

- the number of OFDM carriers (chunks). The more numerous the chunks (for a fixed $\mathcal{W}$ band), the more efficient the system.
- the channel length per chunk. The shorter the channel, the most efficient the system.
- the ratio $\mathcal{G}/\mathcal{W}$. This is the most difficult compromise to be analyzed since it links all the previous points. Basically, the higher $\mathcal{G}/\mathcal{W}$ the more important the high SNR outage performance loss but the better the better the diversity gain (that proves to show better performance in low to medium SNR performance).

REFERENCES

[1] ANSI/IEEE Std 802.11, 1999 Edition (R2003), http://standards.ieee.org/getieee802/download/802.11-1999.pdf
[2] "Air Interface for Fixed and Mobile Broadband Wireless Access Systems", http://standards.ieee.org/getieee802/download/802.16e-2005.pdf
[3] http://www.3gpp.org/Highlights/LTE/LTE.htm
[4] C. E. Shannon, "A Mathematical Theory of Communication", The Bell System Technical Journal, Vol. 27, pp. 379-423, 623-656, July, October, 1948.
[5] P. Viswanath, D. Tse and R. Laroia, "Opportunistic beam-forming using dumb antennas", IEEE International Symposium on Information Theory. IEEE. 2002, pp.449
[6] R. Müller, R. Bains, J. Aas, "Compact MIMO Receive Antennas", Invited for 43rd Annual Allerton Conference on Communications, Control and Computing, Monticello, Ill., U.S.A., September 2005.
[7] J. A. Bingham, "Multicarrier modulation for data transmission: An idea whose time has come," IEEE Commun. Mag., vol. 28, pp. 5-14, May 1990.
[8] M. Debbah, "Mobile Communication Techniques", course, part III, Eurecom Institut, September, 2003
[9] M. R. McKay, P. J. Smith, H. A. Suraweera, and I. B. Collings, "On the Mutual Information Distribution of OFDM-Based Spatial Multiplexing: Exact Variance and Outage Approximation", to appear in IEEE Transactions on Information Theory, 2007.
[10] R. M. Gray, "Toeplitz and Circulant Matrices: A Review", Now Publishers, Norwell, Mass., 1977.
[11] Ericsson, Nokia, Motorola, Rohde & Schwarz, "Proposal for LTE channel models", TSG-RAN WG4 meeting #43, R4-070572, Kobe, Japan, 7-11 May, 2007.
[12] L. Zheng and D. N. Tse, "Diversity and multiplexing: A fundamental tradeoff in multiple antenna channels," IEEE Trans. Inform. Theory, vol. 49, no. 5, pp. 1073-1096, May 2003.
[13] J. Mitola, and Jr G Q Maguire, "Cognitive radio: making software radios more personal", Personal Communications, IEEE [see also IEEE Wireless Communications] 6 (4), 13-18, 1999.
[14] D. Tse and S. Viswanath, "Fundamentals of Wireless Communication", Cambridge University Press, 2005.
[15] A. J. Goldsmith, S. A. Jafar, N. Jindal and S. Vishwanath, "Capacity limits of MIMO channels" IEEE J. Sel. Areas Commun. v21 i5. 684-702
[16] Shin, H. and Lee, J. H., "Capacity of multiple-antenna fading channels: spatial fading correlation, double scattering, and keyhole", IEEE Trans. Inform. Theory. v49. 2636-2647. October 2003
[17] E. Biglieri, J. Proakis, and S. Shamai, "Fading channels: Information theoretic and communications aspects," IEEE Trans. on Inf. Theory, vol. 44, no. 6, pp. 2619-2692, October 1998.
[18] A. Clark, P. J. Smith, D. P. Taylor, "Instantaneous Capacity of OFDM on Rayleigh-Fading Channels", IEEE Transactions on Information Theory 53 (1) 355-361 (2007)
[19] S. Vishwanath, N. Jindal, and A. Goldsmith, ?Duality, achievable rates, and sum-rate capacity of Gaussian MIMO broadcast channels," IEEE Trans. Inf. Theory, vol. 49, no. 10, pp. 2658-2668, October 2003
[20] D. D. Yu, J. M. Cioffi, "Iterative Water-filling for Optimal Resource Allocation in OFDM Multiple-Access and Broadcast Channels", GLOBECOM 2006
[21] A. Dammann and S. Kaiser, "Performance of low complex antenna diversity techniques for mobile OFDM systems", in Proceedings 3rd International Workshop on Multi-Carrier Spread-Spectrum & Related Topics (MC-SS 2001), Oberpfaffenhofen, Germany, pages 53-64, September 2001

The invention claimed is:

1. An Orthogonal Frequency Division Multiplexing (OFDM) process for transmitting data using multiple carriers through a communication channel having a bandwidth W split in N subcarriers arranged in K chunks of M subcarriers each, with N−K×M subcarriers=2×Ms being allocated to form at least a first guard band and a second guard band located at the left side and at the right side of said bandwidth, respectively, said process comprising:

automatically and periodically shifting, for each OFDM symbol being transmitted, said chunks to left or right of the subcarriers allocated to each chunk in order to overlap said guard bands and increase spectral diversity in short-time transmissions;

receiving a sequence of OFDM symbol N-length vector $s=(s_1 \ldots s_N)$ in the frequency domain;

applying an inverse Discrete Fourier Transform (IDFT) in order to generate a vector x based on the following formula:

$$x = F_{N,\alpha}^H s$$
$$= \left[F_N \text{diag}\left(1, e^{i\alpha \frac{1}{N}}, \ldots, e^{i\alpha \frac{N-1}{N}}\right)\right]^H s$$

where $F_N$ corresponds to the N-size Discrete Fast Transform (DFT) matrix with entries $$F_{m,n} = e^{-2\pi i \frac{nm}{N}}$$

copying and multiplying the $N_L$ first symbols of x by $e^{i\alpha}$ in order to constitute a cyclic-prefix preventing inter-symbol interference;

concatenating the said cyclic-prefix with the said vector x in order to form an extended vector:

$$x_{ext} = [e^{i\alpha} x_{N-NL+1}, e^{i\alpha} x_{N-NL+2}, \ldots, e^{i\alpha} x_N, x_1, \ldots, x_N]^T$$

transmitting said extended vector through said communication channel.

2. The OFDM process in accordance with claim 1, further comprising, for each symbol being transmitted, a first shift towards left of the subcarriers allocated to each chunk;

a second shift towards right of the subcarriers allocated to the chunks, so as to increase spectral diversity.

3. The OFDM process according to claim 1 wherein three distinctive values $\alpha_1, \alpha_2, \alpha_3$ are successively applied for three consecutive OFDM symbol vectors.

4. The OFDM process according to claim 3 wherein the three distinct values are $(-\alpha, 0, \alpha)$ and are applied in order to alternatively cause a shift to right and a shift to left of the allocation of the subcarriers to said chunks.

5. The OFDM process according to claim 1, wherein a shifting pattern is defined as:

$$\mathcal{M} = \left\{0, e^{2\pi i \frac{1}{M}}, \ldots, e^{2\pi i \frac{M-1}{M}}\right\}.$$

6. An Orthogonal Frequency Division Multiplexing (OFDM) process for transmitting data using multiple carriers through a communication channel having a bandwidth W split in N subcarriers arranged in K chunks of M subcarriers each, with N−K×M subcarriers=2×Ms being allocated to form at least one a first guard band and a second guard band located at the left side and at the right side of said bandwidth, respectively, said process comprising:

automatically and periodically shifting, for each OFDM symbol being transmitted, said chunks to left or right of the subcarriers allocated to each chunk in order to overlap said guard band bands and increase spectral diversity in short-time transmissions;

receiving $N_L$ symbols and suppressing the said cyclic prefix in order to generate a vector y;

generating a length-N vector z in accordance with the formula:

$$x = F_{N,\alpha} y$$
$$= F_N \text{diag}\left(1, e^{i\alpha \frac{1}{N}}, \ldots, e^{i\alpha \frac{N-1}{N}}\right) y$$

where $F_N$ corresponds to the N-size Discrete Fast Transform (DFT) matrix with $$F_{m,n} = e^{-2\pi i \frac{nm}{N}}$$

forwarding said z vector to a receiver unit.

7. Method of Orthogonal Frequency Division Multiplexing (OFDM) Data-Communication, comprising:

transforming data symbols into a frequency domain by Fourier Transformation turning a frequency-selective channel into N flat fading parallel transmission channels using a cyclic prefix (CP) to suppress inter-symbol interference (ISI) wherein a received signal r is identified from a sent signal s by $r = HF^{-1}s + n$, wherein n is Additive White Gaussian Noise with variance $\sigma^2$, and H is a circulant matrix which is diagonalized in the Fourier basis F, with diagonal elements the discrete Fourier transform of the first column $[h_0, \ldots, h_{L-1}, 0, \ldots, 0]^T$ by multiplying r in with F with $$F \cdot r = \text{diag}\left(H(0), \ldots, H\left(\frac{N-1}{N}\right)\right) s + n,$$

wherein $H(.)$ is the discrete Fourier transformation (DFT) of the first column of H $$H\left(\frac{m}{N}\right) = \sum_{j=0}^{L-1} h_j e^{-2\pi i j \frac{m}{n}};$$

multiplying samples of the cyclic prefix by $z = \rho e^{i\alpha}$ where $\rho$ is constrained to equal 1; and multiplying the OFDM signal by $(1, e^{-i\alpha/N}, \ldots, e^{-i\alpha(N-1)/N})$ after the inverse DFT (IDFT), leading to $\alpha$-OFDM.

* * * * *

UNITED STATES PATENT AND TRADEMARK OFFICE
CERTIFICATE OF CORRECTION

PATENT NO.       : 8,687,719 B2
APPLICATION NO.  : 13/001934
DATED            : April 1, 2014
INVENTOR(S)      : Debbah et al.

Page 1 of 4

It is certified that error appears in the above-identified patent and that said Letters Patent is hereby corrected as shown below:

In the Specification

In Column 6, Line 36, delete "of," and insert -- of --, therefor.

In Column 6, Line 42, in Equation (6), delete "$Hv=\phi v$" and insert -- $Hv = \phi v.$ --, therefor.

In Column 7, Line 5, in Equation (9), delete " $\phi \sum_{k=0}^{L-1} h_k \rangle^{-k}$ " and insert -- $\phi = \sum_{k=0}^{L-1} h_k \rangle^{-k}$ --, therefor.

In Column 7, Line 22, delete "$\rho e^{-m}$," and insert -- $\rho e^{-i\alpha}$, --, therefor.

In Column 7, Line 32, in Equation (11), delete " $\phi_m = \sum_{j=0}^{L-1} h_j \rho^{\frac{1}{N}} e^{i\alpha \frac{i}{N}} e^{-2\pi i j \frac{m}{N}}$ " and insert -- $\phi_m = \sum_{j=0}^{L-1} h_j \rho^{\frac{j}{N}} e^{i\alpha \frac{i}{N}} e^{-2\pi i j \frac{m}{N}}$ --, therefor.

Signed and Sealed this
Twenty-seventh Day of March, 2018

Andrei Iancu
*Director of the United States Patent and Trademark Office*

CERTIFICATE OF CORRECTION (continued)

In Column 8, Line 46, in Equation (18), delete "$(1, e^{-i\alpha/N}, \ldots, e^{-i\alpha(N-1)/N})$" and insert -- $\left(1, e^{-i\alpha/N}, \ldots, e^{-i\alpha(N-1)/N}\right)$ --, therefor.

In Column 9, Line 11, in Equation (22), delete "$\forall m \in [0, N-1], \Phi(m,k) = H(m-1) \bmod N$" and insert -- $\forall m \in [0, N-1], \Phi(m,k) = H((m-l) \bmod N)$ --, therefor.

In Column 9, Line 13, delete "a" and insert -- α --, therefor.

In Column 9, Line 48, in Equation (25), delete "Ca" and insert -- Cα --, therefor.

In Column 11, Line 18, delete "$\mathcal{W} \sqrt{\mathcal{W}}$" and insert -- $\mathcal{W}_u \sqrt{\mathcal{W}}$ --, therefor.

In Column 11, Line 20, delete "$\mathcal{W})$" and insert -- $\mathcal{W}_u)$ --, therefor.

In Column 11, Line 25, delete "$\mathcal{W}$" and insert -- $\mathcal{W}_u$ --, therefor.

In Column 11, Line 61, in Equation (35), delete "$$C_{\#1} = \frac{1}{MN_u} \sum_{m=0}^{N_u-1} \sum_{\alpha \in \mathcal{M}} \log\left(1 + \frac{\left|\Phi\left(\frac{m}{N}, k\right)\right|^2}{\sigma^2}\right)$$" and insert -- $$C_{\#1} = \frac{1}{MN_u} \sum_{m=0}^{N_u-1} \sum_{\alpha \in \mathcal{M}} \log\left(1 + \frac{\left|\Phi\left(\frac{m}{N}, k\right)\right|^2}{\sigma^2}\right)$$ --, therefor.

In Column 12, Line 50, delete "$\beta_m$," and insert -- $\beta_m$ --, therefor.

In Column 13, Line 30, delete "$\mathcal{W}/\mathcal{W}$," and insert -- $\mathcal{W}/\mathcal{W}_u$, --, therefor.

CERTIFICATE OF CORRECTION (continued)
U.S. Pat. No. 8,687,719 B2

In Column 13, Line 31, delete "$M = \lceil W/W \rceil$" and insert -- $M = \lceil W/W_u \rceil$ --, therefor.

In Column 15, Line 35, in Equation (42), delete "$C_{SNR} \overset{\cdot}{SNR \to \infty} N_u \log(SNR)$" and insert -- $C \overset{\cdot}{\underset{SNR \to \infty}{}} N_u \log(SNR)$ --, therefor.

In Column 16, Line 5, delete "(N-G)" and insert -- (N-G)/K --, therefor.

In Column 16, Line 27, delete "$W/W\}$," and insert -- $W_e/W\}$, --, therefor.

In Column 21, Line 6, delete "$G$ and $G$" and insert -- $G_1$ and $G_2$ --, therefor.

In Column 21, Line 7, delete "$G = G = G$" and insert -- $G_1 = G_2 = G$ --, therefor.

In Column 21, Line 9, delete "$W - G - G$," and insert -- $W - G_1 - G_2$, --, therefor.

In Column 21, Line 11, delete "$W, W, \ldots, W_{\mathcal{K}}$." and insert -- $W_1, W_2, \ldots, W_{\mathcal{K}}$. --, therefor.

In Column 21, Line 13, delete "$W_k + G + G)/\Delta_f$" and insert -- $(W_k + G_1 + G_2)/\Delta_f$ --, therefor.

In Column 21, Line 16, delete "$G$ or $\overline{G}$" and insert -- $G_1$ or $G_2$ --, therefor.

CERTIFICATE OF CORRECTION (continued)
U.S. Pat. No. 8,687,719 B2

In the Claims

In Column 24, Line 10, in Claim 6, delete "$x = F_{N,\alpha} y$" and insert -- $z = \mathbf{F}_{N,\alpha} \mathbf{y}$ --, therefor.

In Column 24, Line 24, in Claim 7, delete "Method" and insert -- A method --, therefor.

In Column 24, Line 36, in Claim 7, delete "r in with F with" and insert -- r with F --, therefor.